(12) United States Patent
Bato et al.

(10) Patent No.: US 9,537,599 B2
(45) Date of Patent: Jan. 3, 2017

(54) OPTICAL TRANSMITTER AND OPTICAL TRANSMISSION METHOD

(71) Applicants: FUJITSU LIMITED, Kawasaki-shi, Kanagawa (JP); FUJITSU TELECOM NETWORKS LIMITED, Kawasaki-shi, Kanagawa (JP)

(72) Inventors: Koji Bato, Fukuoka (JP); Tomoyuki Sakata, Fukuoka (JP); Tatsuro Kishida, Fukuoka (JP); Koji Matsunaga, Munakata (JP); Tatsuya Toyozumi, Onojo (JP); Yuichiro Sakane, Fukuoka (JP); Tomonori Yamada, Kanagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/747,728

(22) Filed: Jun. 23, 2015

(65) Prior Publication Data

US 2016/0020852 A1 Jan. 21, 2016

(30) Foreign Application Priority Data

Jul. 16, 2014 (JP) .................. 2014-145616

(51) Int. Cl.
*H04B 10/02* (2006.01)
*H04J 14/02* (2006.01)
(Continued)

(52) U.S. Cl.
CPC ......... *H04J 14/0221* (2013.01); *H04B 10/296* (2013.01); *H04Q 11/0066* (2013.01)

(58) Field of Classification Search
CPC .............. H04B 10/0795; H04B 10/07955; H04B 10/0797; H04B 10/0793; H04J 14/02; H04J 14/0221
(Continued)

(56) References Cited

U.S. PATENT DOCUMENTS

| 8,121,486 B2 * | 2/2012 | Uda | ........... | H04B 10/0777 |
| | | | | 398/177 |
| 2005/0213968 A1 * | 9/2005 | Uda | ........... | H04B 10/00 |
| | | | | 398/30 |

(Continued)

FOREIGN PATENT DOCUMENTS

| JP | 2008-300818 | 12/2008 |
| JP | 2011-243765 | 12/2011 |
| JP | 2012-186571 | 9/2012 |

*Primary Examiner* — Hanh Phan
(74) *Attorney, Agent, or Firm* — Staas & Halsey LLP

(57) ABSTRACT

An optical transmitter includes an amplifying unit, a monitor, an identifying unit, and a controlling unit. The amplifying unit amplifies an optical signal in which an optical packet signal is mixed in optical path signals. The monitor monitors power of the optical signal on an input stage and an output stage of the optical amplifying unit, respectively. The identifying unit identifies an optical packet signal section on the input stage side based on the monitoring result on the input stage side, and identifies an optical packet signal section on the output stage side based on the monitoring result on the output stage side. The controlling unit compares the power of the identified section on the input stage side with the power of the identified section on the output stage side, and controls an amplification factor of the amplifying unit based on a power difference resulting from the comparison.

6 Claims, 16 Drawing Sheets

(51) Int. Cl.
*H04B 10/296* (2013.01)
*H04Q 11/00* (2006.01)
(58) Field of Classification Search
USPC ....... 398/177, 181, 173, 175, 176, 178, 180,
398/179, 79, 33, 34, 38, 30, 31, 32, 182,
398/183, 135, 136, 200, 201, 59, 83, 45;
359/341.41, 341.42, 341.43, 341.5,
359/341.31, 337
See application file for complete search history.

(56) References Cited

U.S. PATENT DOCUMENTS

2010/0221012 A1    9/2010  Awaji
2011/0286085 A1*  11/2011  Sone .................. H04B 10/2942
359/341.41

* cited by examiner

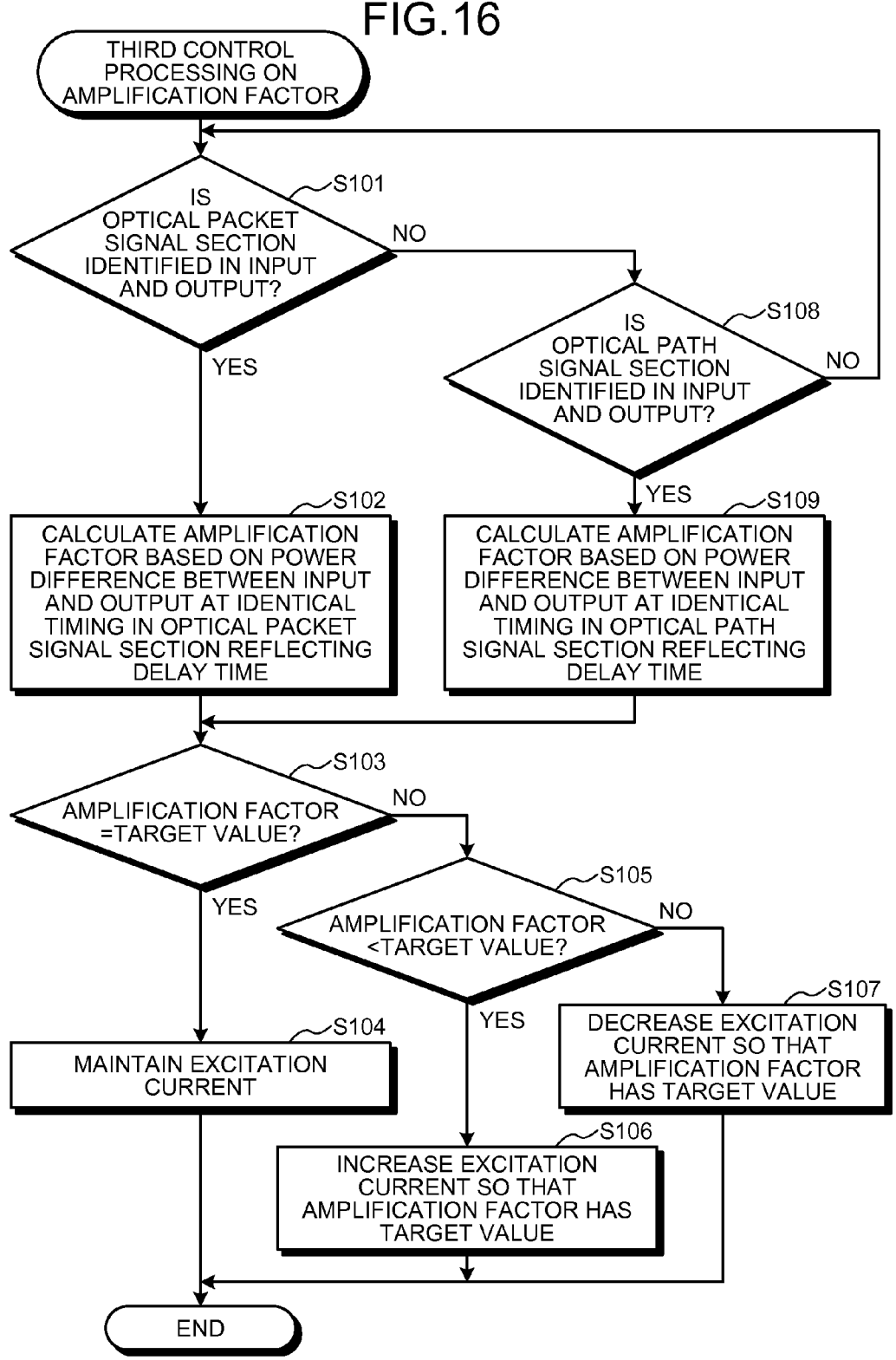

OPTICAL TRANSMITTER AND OPTICAL TRANSMISSION METHOD

CROSS-REFERENCE TO RELATED APPLICATION

This application is based upon and claims the benefit of priority of the prior Japanese Patent Application No. 2014-145616, filed on Jul. 16, 2014, the entire contents of which are incorporated herein by reference.

FIELD

The embodiments discussed herein are related to an optical transmitter and an optical transmission method.

BACKGROUND

A wavelength division multiplex (WDM) system has transmitted an optical signal in which an optical path signal between the WDM system and, for example, an optical transport network (OTN) is subjected to optical wavelength division multiplexing. However, in recent years, a flexible operation of a transmission path has been desired in association with the complicated network configuration such as a ring network and a mesh network.

When a transmission path is changed due to disconnection of the transmission path on a network and the like, the WDM system also increases or decreases the number of wavelengths of signals passing through each optical transmitter on the transmission path. In an optical amplifier inside each optical transmitter, an auto gain control (AGC) system is used for promptly coping with a variation in optical power of an optical signal corresponding to a variation in the number of signal wavelengths. The optical amplifier in the AGC system compares input power of an optical signal in an amplifier input stage with output power of the optical signal in an amplifier output stage, and controls an amplification factor to be a certain amplification factor corresponding to a power difference resulting from the comparison.

In the WDM system, a technique has been developed for transmitting optical signals in which, in addition to optical path signals, optical packet signals generated in a burst manner between the WDM system and a local area network (LAN) such as an Ethernet (registered trademark) network are subjected to optical wavelength division multiplexing. In the WDM system, because optical packet signals are generated at user's use timing, in other words, at random, therefore, optical packet signals exist in a burst manner in an optical signal. In addition, an optical packet signal has a random signal length and signal interval. In an optical transmitter in the WDM system, in this manner, input power of an optical amplifier greatly varies depending on the presence of an optical packet signal in an optical signal. Related technologies are described in Japanese Laid-open Patent Publication No. 2011-243765, for example.

It is assumed that input power is stably input to the AGC-system optical amplifier for a certain period of time. However, in the WDM system transmitting an optical signal in which an optical path signal and an optical packet signal are subjected to optical wavelength division multiplexing, optical packet signals is mixed in an optical signal in a burst manner. This results in that input power of the optical amplifier greatly varies depending on the presence of an optical packet signal in an optical signal.

The AGC-system optical amplifier has difficulty in ensuring a stable amplification factor because input power varies depending on the presence of an optical packet signal in an optical signal and a power difference thereof varies. When an optical packet signal exists in an optical signal in an amplifier input stage and no optical packet signal exists in the optical signal in an amplifier output stage at an identical monitoring timing, a power difference between the input power in the input stage and the output power in the output stage varies and the optical amplifier has difficulty in ensuring a stable amplification factor.

SUMMARY

According to an aspect of the embodiments, an optical transmitter includes an amplifying unit, a monitor, an identifying unit and a controlling unit. The amplifying unit amplifies optical signals in which an optical packet signal is mixed in optical path signals. The monitor monitors power of the optical signals related to an input stage and an output stage of the amplifying unit. The identifying unit identifies an optical packet signal section on the input stage side in which the optical packet signal exists in the optical signals based on the monitoring result of the power of the optical signal on the input stage side. The identifying unit identifies the optical packet signal section on the output stage side based on the monitoring result of the power of the optical signal on the output stage side. The controlling unit compares the power in the optical packet signal section on the input stage side identified by the identifying unit with the power in the optical packet signal section on the output stage side identified by the identifying unit. The controlling unit controls an amplification factor of the amplifying unit based on the comparison result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a flowchart illustrating an example of processing operation inside the optical amplifier related to third control processing on an amplification factor.

DESCRIPTION OF EMBODIMENTS

Preferred embodiments of the present invention will be explained with reference to accompanying drawings. It is noted that the embodiments are not intended to limit the scope of the disclosed technique. The embodiments described below can be combined appropriately unless they are contradictory to each other.

[a] First Embodiment

Figure 1:
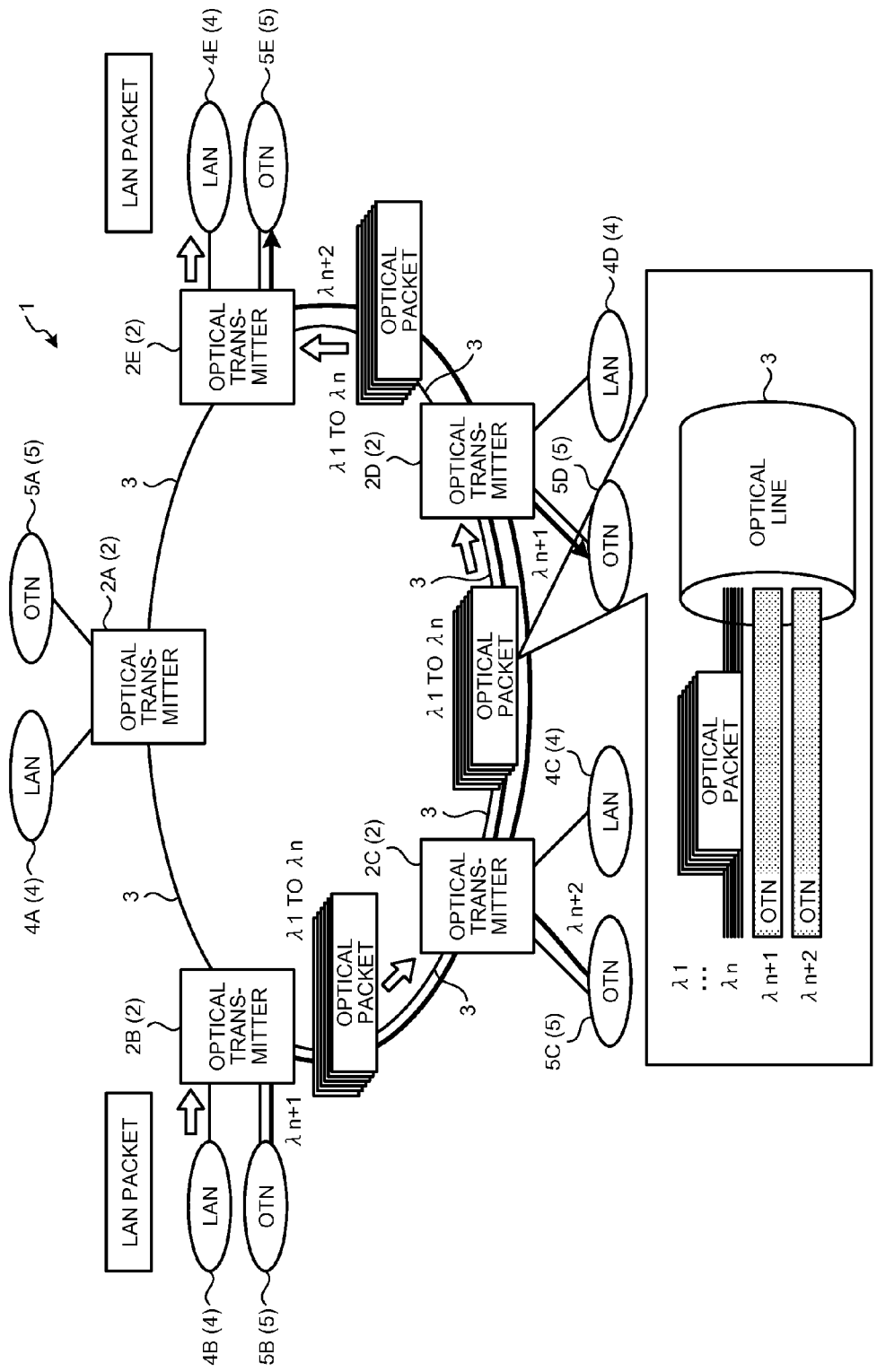
FIG. 1 is an explanatory view illustrating an example of a wavelength division multiplex (WDM) system.

FIG. 1 is an explanatory view illustrating an example of a wavelength division multiplex (WDM) system. A WDM system 1 illustrated in FIG. 1 is configured by connecting a plurality of optical transmitters 2 to each other through a wavelength division multiplex (WDM) line (hereinafter simply referred to as an optical line) 3 and transmitting optical signals subjected to optical wavelength division multiplexing through the optical line 3. The optical transmitters 2 (2A to 2E) are connected to the respective local area networks (LANs) 4 (4A to 4E) and the respective optical transport networks (OTNs) 5 (5A to 5E). The optical transmitters 2 transmit an optical packet signal in a LAN packet to the respective LANs 4, for example, and transmit an optical path signal to the respective OTNs 5, for example. An optical path signal is temporally continuous, and an optical packet signal is generated in a burst manner. The optical transmitters 2 transmit optical signals in which an optical packet signal and an optical path signal are subjected to optical wavelength division multiplexing through the optical line 3. An optical signal includes an optical path signal, but may include no optical packet signal depending on user's use timing.

The optical transmitter 2A is connected to, for example, the LAN 4A and the OTN 5A. The optical transmitter 2B is connected to, for example, the LAN 4B and the OTN 5B. The optical transmitter 2C is connected to, for example, the LAN 4C and the OTN 5C. The optical transmitter 2D is connected to, for example, the LAN 4D and the OTN 5D. The optical transmitter 2E is connected to, for example, the LAN 4E and the OTN 5E.

The optical transmitter 2B illustrated in FIG. 1 inputs optical packet signals of wavelengths λ1 to λn addressed from the LAN 4B to the LAN 4E, and inputs an optical path signal of a wavelength λn+1 addressed from the OTN 5B to the OTN 5D. The optical transmitter 2B transmits optical signals in which the input optical packet signals and optical path signal are subjected to optical wavelength division multiplexing to the optical transmitter 2C through the optical line 3. The optical transmitter 2C inputs an optical path signal of a wavelength λ1 to λn addressed from the OTN 5C to the OTN 5E, inputs the optical signals from the optical transmitter 2B, and transmits an optical signal into which the optical path signal is subjected to optical wavelength division multiplexing to the optical transmitter 2D through the optical line 3.

The optical transmitter 2D inputs the optical signals from the optical transmitter 2C, demultiplexes the optical path signal addressed to the OTN 5D from the optical signals, and transmits the demultiplexed optical path signal to the OTN 5D. The optical transmitter 2D transmits the optical signals from which the optical path signal is demultiplexed to the optical transmitter 2E through the optical line 3. The optical transmitter 2E inputs the optical signals from the optical transmitter 2D, demultiplexes the optical path signal addressed to the OTN 5E and the optical packet signals addressed to the LAN 4E from the optical signals, and transmits the optical path signal addressed to the OTN 5E to the OTN 5E and the optical packet signals addressed to the LAN 4E to the LAN 4E.

Figure 2:
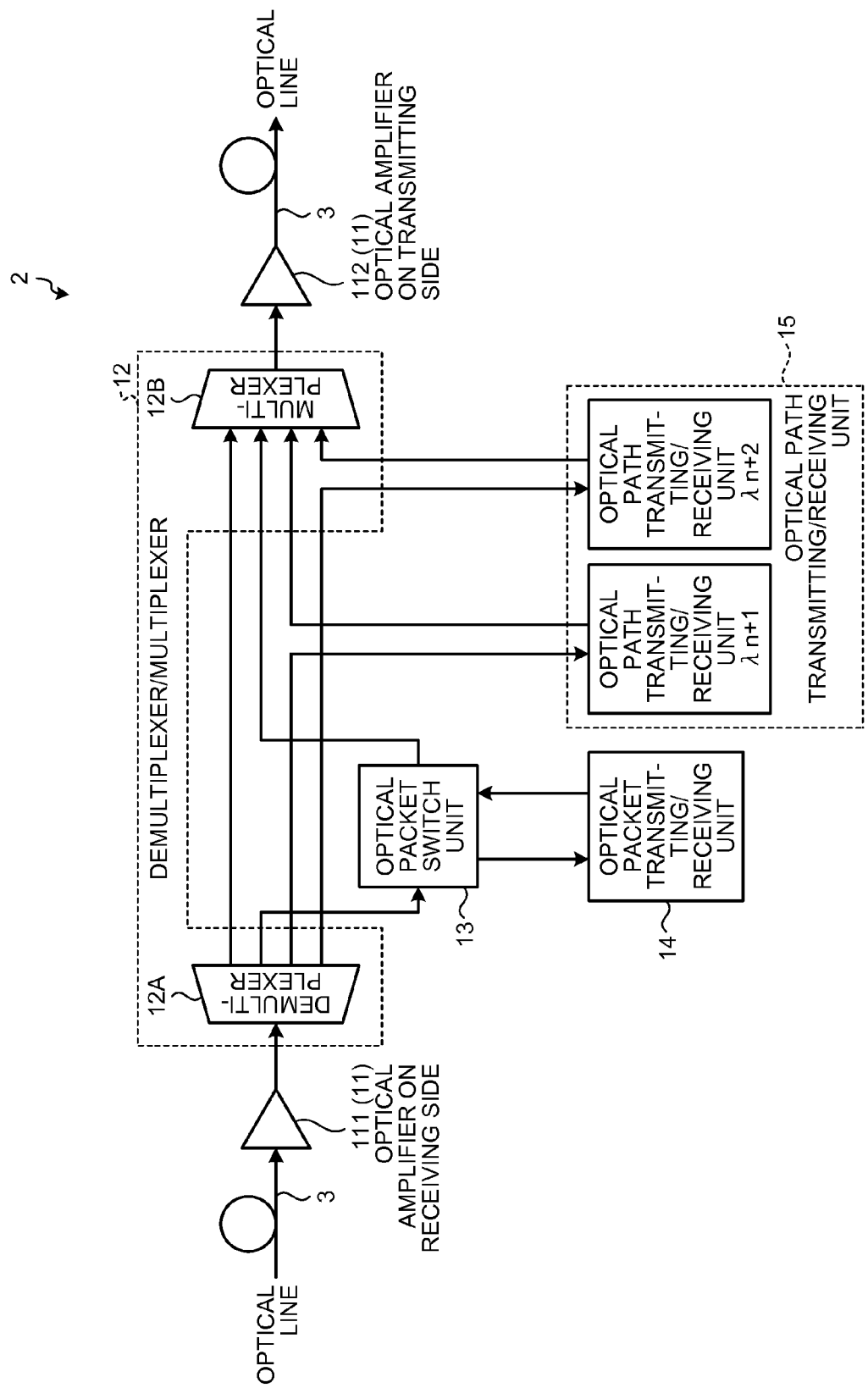
FIG. 2 is an explanatory view illustrating an example of an optical transmitter according to a first embodiment of the present invention.

FIG. 2 is an explanatory view illustrating an example of each of the optical transmitters 2. Each of the optical transmitters 2 illustrated in FIG. 2 includes an optical amplifier 111 (11) on a receiving side, an optical amplifier 112 (11) on a transmitting side, a demultiplexer/multiplexer 12, an optical packet switch unit 13, an optical packet transmitting/receiving unit 14, and optical path transmitting/receiving units 15. The optical amplifier 111 on a receiving side is an AGC-system amplifier that amplifies an optical signal through the optical line 3. The demultiplexer/multiplexer 12 includes a demultiplexer 12A that demultiplexes an optical path signal and an optical packet signal from an optical signal amplified by the optical amplifier 111 on a receiving side, and a multiplexer 12B that multiplexes an optical path signal and an optical packet signal with an optical signal amplified by the optical amplifier 111 on a receiving side.

The optical packet transmitting/receiving unit 14 is connected to, for example, each of the LANs 4, and is a communication unit that transmits/receives an optical packet signal in a LAN packet with each of the LANs 4. Each of the optical path transmitting/receiving units 15 is connected to, for example, each of the OTNs 5, and is a communication unit that transmits/receives an optical path signal for each optical wavelength with each of the OTNs 5. The optical packet switch unit 13 switches and connects the demultiplexer/multiplexer 12 with the optical packet transmitting/receiving unit 14. The optical amplifier 11B on a transmitting side is an AGC-system amplifier that amplifies and outputs an optical signal multiplexed by the multiplexer 12B through the optical line 3.

Figure 3:
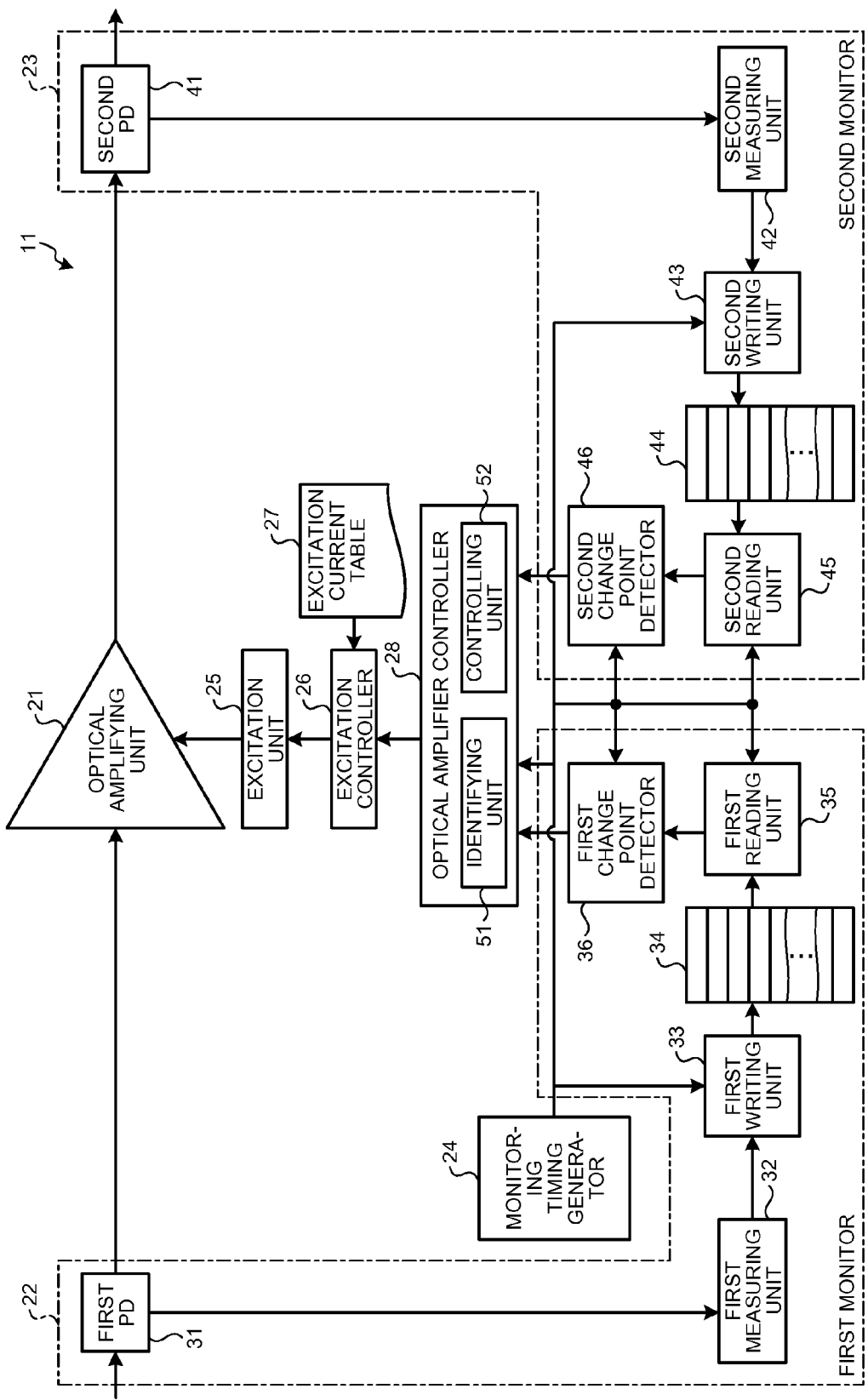
FIG. 3 is an explanatory view illustrating an example of an optical amplifier according to the first embodiment.

FIG. 3 is an explanatory view illustrating an example of optical amplifiers 11 according to a first embodiment. The optical amplifier 11 illustrated in FIG. 3 includes an optical amplifying unit 21, a first monitor 22, a second monitor 23, a monitoring timing generator 24, an excitation unit 25, an excitation controller 26, an excitation current table 27, and an optical amplifier controller 28.

The optical amplifying unit 21 corresponds to, for example, a rare-earth doped fiber such as an erbium doped-fiber (EDF), and amplifies and outputs an optical signal depending on a laser beam from the excitation unit 25. The first monitor 22 converts an optical signal in an input stage of the optical amplifying unit 21 into an electrical signal and measures the input power so as to acquire the input power resulting from the measurement result. The second monitor 23 converts an optical signal in an output stage of the optical amplifying unit 21 into an electrical signal and measures the output power so as to acquire the output power resulting from the measurement result. The monitoring timing generator 24 generates monitoring timings used for acquiring input power by the first monitor 22 and output power by the second monitor 23. The interval of monitoring timings equivalents to the interval allowing a monitor to recognize the presence of an optical packet signal with the shortest length out of the optical packet signals. Specifically, the interval of monitoring timings is determined to be equal to or smaller than the packet length of the optical packet signal with the shortest length. More specifically, the interval of monitoring timings is determined, for example, to be equal to or smaller than one-fifth the packet length of the optical packet signal with the shortest length. That is, the interval= (packet length per wave length×8/bit rate)×⅕.

The optical amplifier controller 28 controls each of the optical amplifiers 11 totally. The optical amplifier controller 28 compares the input power acquired by the first monitor 22 with the output power acquired by the second monitor 23 to calculate a power difference resulting from the comparison. The excitation controller 26 acquires an excitation current depending on the power difference from the excitation current table 27 and supplies the acquired excitation current to the excitation unit 25. The excitation unit 25 corresponds to a laser optical source, and supplies a laser beam depending on the excitation current from the excitation controller 26 to the optical amplifying unit 21. The optical amplifying unit 21 amplifies an optical signal depending on the laser beam from the excitation unit 25. The optical amplifier controller 28 controls an amplification factor of the optical amplifying unit 21 based on a power difference resulting from the comparison.

The first monitor 22 includes a first photodiode (hereinafter simply referred to as PD) 31, a first measuring unit 32, a first writing unit 33, a first memory 34, a first reading unit 35, and a first change point detector 36. The first PD 31 is located in the input stage of the optical amplifying unit 21 and converts an optical signal in an input stage of the optical amplifying unit 21 into an electrical signal. The first measuring unit 32 measures input power at a monitoring timing through the first PD 31 based on the monitoring timing from the monitoring timing generator 24.

The first writing unit 33 performs digital conversion on input power resulting from the measurement by the first measuring unit 32 and stores the digitized input power in the first memory 34. The first reading unit 35 reads input power measured at each monitoring timing from the first memory 34. The first change point detector 36 detects a change point from the read input power. Specifically, the first change point detector 36 detects a rising change point and a falling change point from the input power. The rising change point serves as a starting point for detecting an optical packet signal section in which an optical packet signal exists in an optical signal. The falling change point serves as an ending point for detecting an optical packet signal section.

The second monitor 23 includes a second PD 41, a second measuring unit 42, a second writing unit 43, a second memory 44, a second reading unit 45, and a second change point detector 46. The second PD 41 is located in the output stage of the optical amplifying unit 21 and converts an optical signal in an output stage of the optical amplifying unit 21 into an electrical signal. The second measuring unit 42 measures output power at a monitoring timing through the second PD 41 based on the monitoring timing from the monitoring timing generator 24.

The second writing unit 43 performs digital conversion on output power resulting from the measurement by the second measuring unit 42 and stores the digitized output power in the second memory 44. The second reading unit 45 reads output power measured at each monitoring timing from the second memory 44. The second change point detector 46 detects a change point from the read output power. Specifically, the second change point detector 46 detects a rising change point and a falling change point from the output power.

The optical amplifier controller 28 includes an identifying unit 51 and a controlling unit 52. The identifying unit 51 identifies an optical packet signal section on the input stage side based on the rising change point and the falling change point of the input power acquired by the first monitor 22. When a rising change point of input power acquired by the first monitor 22 is detected, the identifying unit 51 determines the input power acquired at the subsequent monitoring timing immediately after the detection as a start point of the optical packet signal section on the input stage side. The identifying unit 51 also identifies an optical packet signal section on the output stage side based on the rising change point and the falling change point of the output power acquired by the second monitor 23. When a rising change point of output power acquired by the second monitor 23 is detected, the identifying unit 51 determines the output power acquired at the subsequent monitoring timing immediately after the detection as a start point of the optical packet signal section on the output stage side.

The controlling unit 52 compares the power in the optical packet signal section on the input stage side with the power in the optical packet signal section on the output stage side and calculates a power difference between the optical packet signal sections. More specifically, the controlling unit 52 compares the average value of the input power in the optical packet signal section on the input stage side with the average value of the output power in the optical packet signal section on the output stage side and calculates a power difference between the optical packet signal sections.

Figure 4:
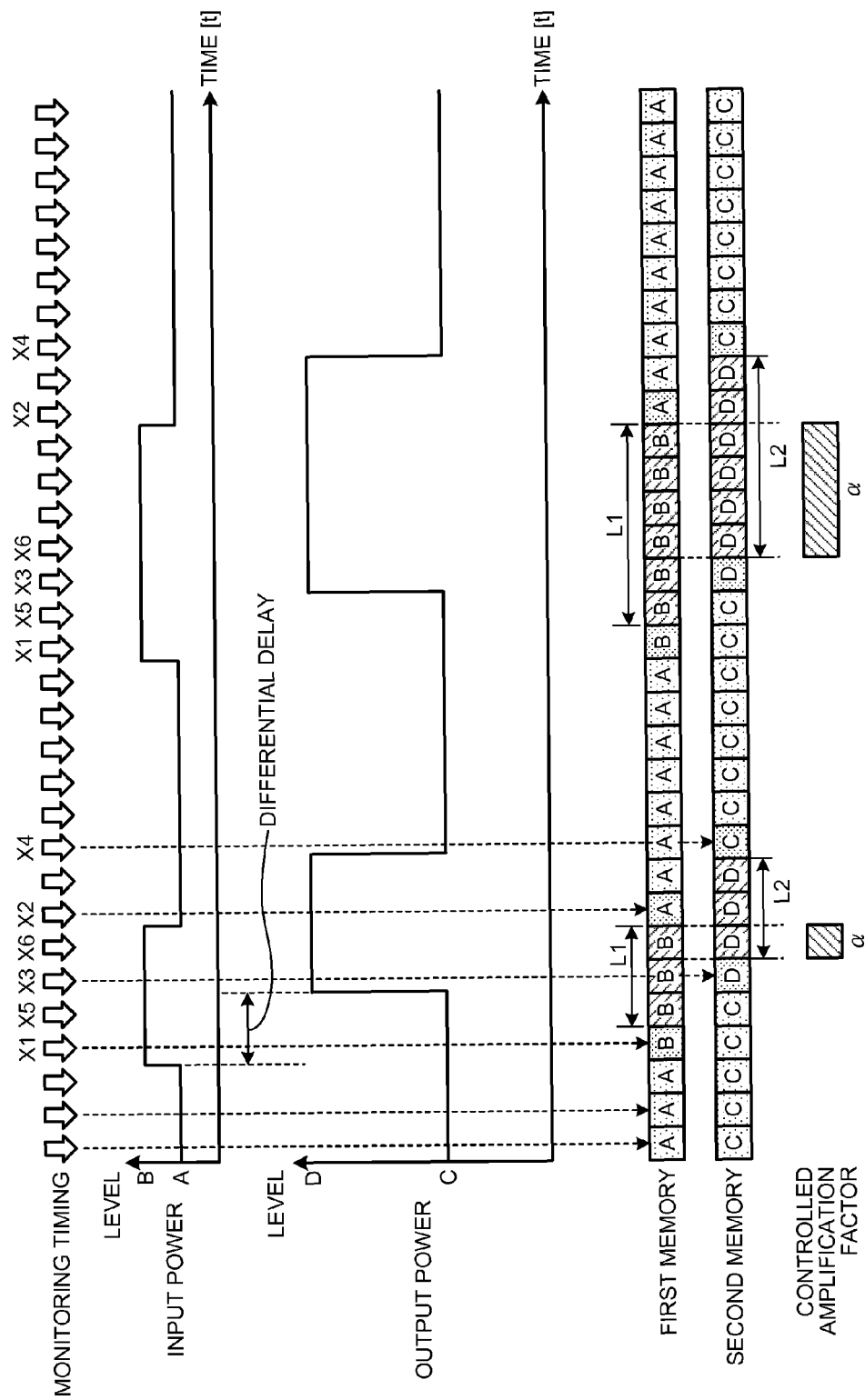
FIG. 4 is an explanatory view illustrating an example of monitoring operation on input and output power of the optical amplifier according to the first embodiment.

FIG. 4 is an explanatory view illustrating an example of monitoring operation on input and output power performed by the optical amplifiers 11. The first change point detector 36 detects a change point from the level A to the level B as a rising change point X1 and detects a change point from the level B to the level A as a falling change point X2 in the input power illustrated in FIG. 4. The second change point detector 46 detects a change point from the level C to the level D as a rising change point X3 and detects a change point from the level D to the level C as a falling change point X4 in the output power illustrated in FIG. 4.

When the first change point detector 36 detects a rising change point X1 in the input power, the identifying unit 51 identifies a section from the subsequent monitoring timing X5 in the input power to the detection of a falling change point X2, as an optical packet signal section on an input stage side L1. When the second change point detector 46 detects a rising change point X3 in the output power, the identifying unit 51 identifies a section from the subsequent monitoring timing X6 in the output power to the detection of a falling change point X4, as an optical packet signal section on an output stage side L2.

Although a differential delay occur between the input timing and the output timing of the optical signal in the optical amplifying unit 21, the controlling unit 52 compares the input power in the optical packet signal section on the input stage side L1 with the output power in the optical packet signal section on the output stage side L2. The controlling unit 52 compares the input power in the optical packet signal section on the input stage side L1 with the output power in the optical packet signal section on the output stage side L2, which are both detected at an identical timing illustrated in FIG. 4, and controls an amplification factor of the optical amplifying unit 21 based on the power difference in the period α.

Figure 5:
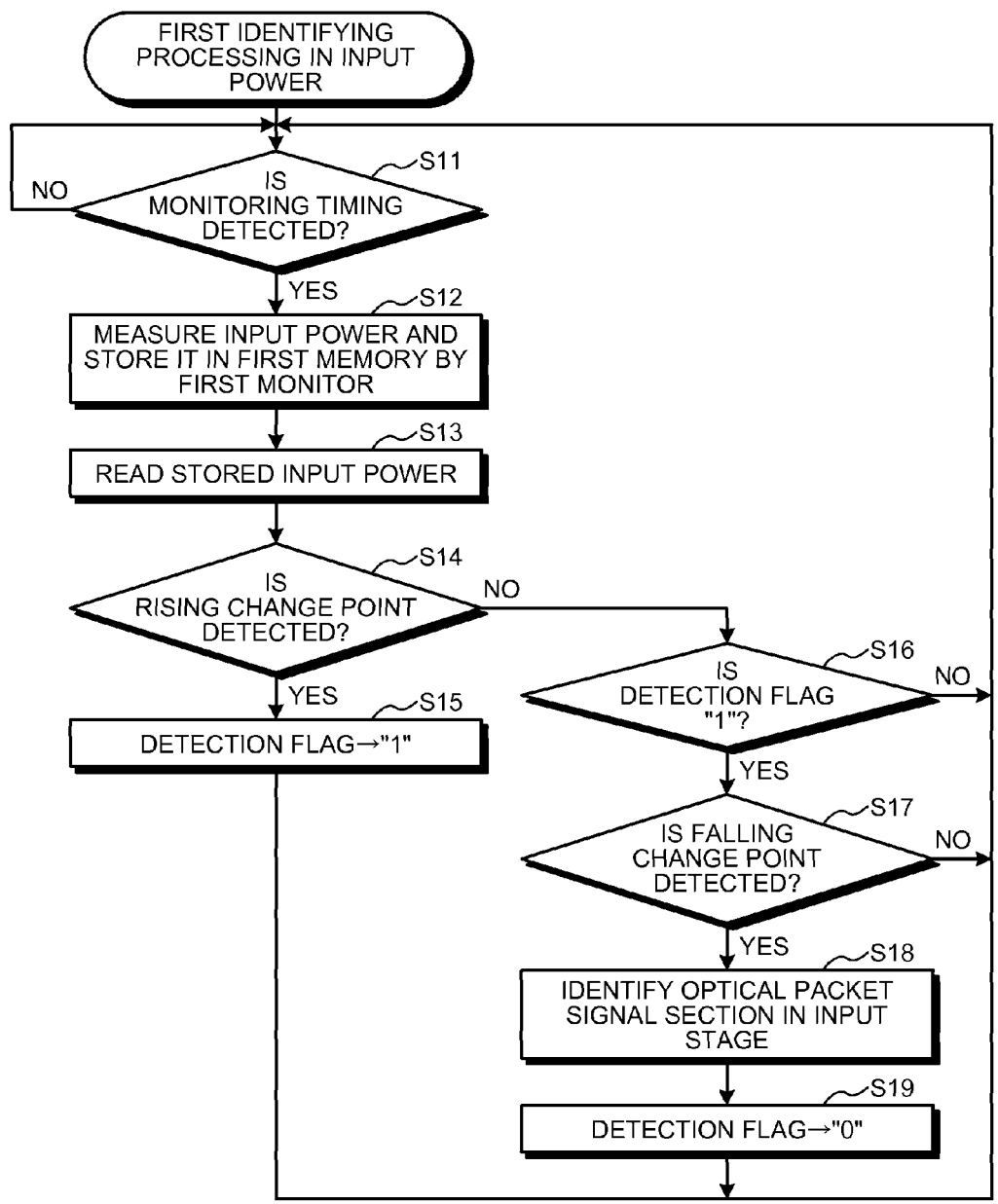
FIG. 5 is a flowchart illustrating an example of processing operation inside the optical amplifier related to first identifying processing of input power.

The following describes operation of an optical transmitter 2 according to the first embodiment. FIG. 5 is a flowchart illustrating an example of processing operation inside the optical amplifiers 11 related to first identifying processing in input power. FIG. 5 illustrates first identifying processing in input power in which the optical packet signal section on the input stage side L1 is identified based on the rising change point and the falling change point detected from the measured input power.

In FIG. 5, the first measuring unit 32 in the first monitor 22 in each of the optical amplifiers 11 determines whether a monitoring timing is detected from the monitoring timing generator 24 (Step S11). When the monitoring timing is detected (Yes at Step S11), the first measuring unit 32 measures the input power at the monitoring timing through the first PD 31 and stores the input power resulting from the measurement in the first memory 34 through the first writing unit 33 (Step S12).

The first reading unit 35 reads the input power at the monitoring timing stored in the first memory 34 (Step S13). The first change point detector 36 determines whether a rising change point is detected in the read input power (Step S14). When the rising change point X1 is detected (Yes at Step S14), the first change point detector 36 sets a detection flag to "1" indicating that a rising change point is detected (Step S15) and performs the processing at Step S11 to determine whether the subsequent monitoring timing is detected. When a rising change point is detected, the detection flag is set to "1" and when no rising change point is detected, the detection flag is set to "0".

When no rising change point is detected in the read input power (No at Step S14), the first change point detector 36 determines whether the detection flag is "1" (Step S16). When the detection flag is "1" (Yes at Step S16), the first change point detector 36 determines whether a falling change point is detected in the input power (Step S17).

When a falling change point is detected in the input power (Yes at Step S17), the identifying unit 51 identifies an optical packet signal section in input stage L1 (Step S18). As illustrated in FIG. 4, the identifying unit 51 identifies a section from the subsequent monitoring timing X5 in the input power immediately after the detection of the rising change point X1 to the falling change point X2, as an optical packet signal section on the input stage side L1. The first change point detector 36 subsequently changes the detection flag from "1" to "0" (Step S19) and performs the processing at Step S11 to detect the subsequent monitoring timing.

When the detection flag is not "1" (No at Step S16) or no falling change point is detected (No at Step S17), the first change point detector 36 performs the processing at Step S11 to detect the subsequent monitoring timing. When no monitoring timing is detected (No at Step S11), the first measuring unit 32 performs the processing at Step S11 to monitor detection of a monitoring timing.

FIG. 5 illustrates the optical amplifiers 11 performing the first identifying processing in input power. Each of the optical amplifiers 11 detects a rising change point and a falling change point from the measured input power for each monitoring timing and identifies an optical packet signal section on the input stage side based on the detection result. As a result, each of the optical amplifiers 11 can identify an optical packet signal section on the input stage side in the input power in the input stage of the optical amplifying unit 21.

Figure 6:
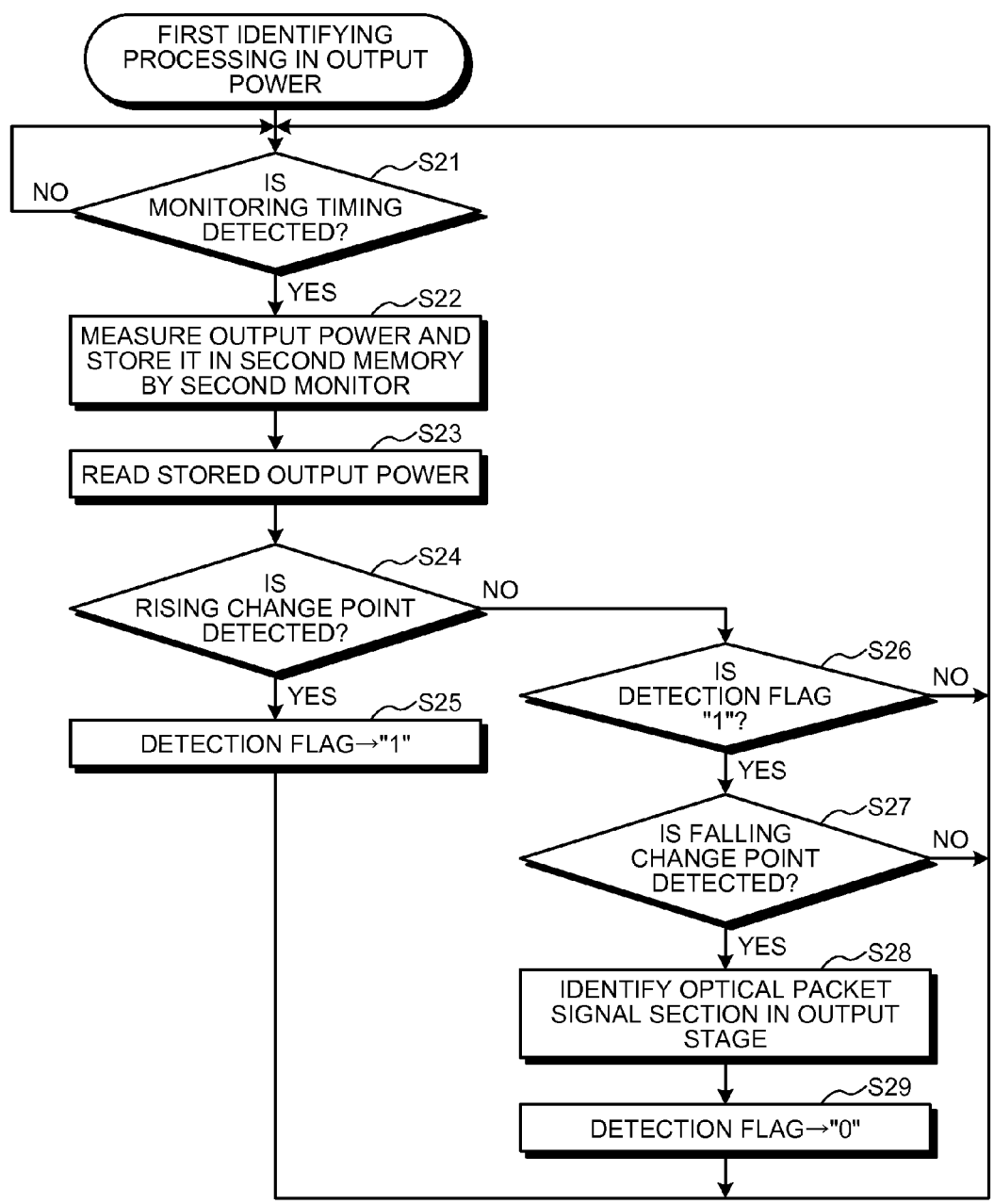
FIG. 6 is a flowchart illustrating an example of processing operation inside the optical amplifier related to first identifying processing of output power.

FIG. 6 is a flowchart illustrating an example of processing operation inside the optical amplifiers 11 related to first identifying processing in output power. FIG. 6 illustrates first identifying processing in output power in which an optical packet signal section on the output stage side is identified based on the rising change point and the falling change point detected from the measured output power.

In FIG. 6, the second measuring unit 42 in the second monitor 23 in each of the optical amplifiers 11 determines whether a monitoring timing is detected from the monitoring timing generator 24 (Step S21). When the monitoring timing is detected (Yes at Step S21), the second measuring unit 42 measures the output power at the monitoring timing through the second PD 41 and stores the output power resulting from the measurement in the second memory 44 through the second writing unit 43 (Step S22).

The second reading unit 45 reads the output power at the monitoring timing stored in the second memory 44 (Step S23). The second change point detector 46 determines whether a rising change point is detected in the read output power (Step S24). When a rising change point is detected (Yes at Step S24), the second change point detector 46 sets the detection flag to "1" indicating that a rising change point is detected (Step S25) and performs the processing at Step S21 to determine whether the subsequent monitoring timing is detected.

When no rising change point is detected in the read output power (No at Step S24), the second change point detector 46 determines whether the detection flag is "1" (Step S26). When the detection flag is "1" (Yes at Step S26), the second change point detector 46 determines whether a falling change point is detected in the output power (Step S27).

When a falling change point is detected in the output power (Yes at Step S27), the identifying unit 51 identifies an optical packet signal section on the output stage side L2 (Step S28). As illustrated in FIG. 4, the identifying unit 51 identifies a section from the subsequent monitoring timing X6 in the output power immediately after the detection of the rising change point X3 to the falling change point X4, as an optical packet signal section on the output stage side L2. The second change point detector 46 subsequently changes the detection flag from "1" to "0" (Step S29) and performs the processing at Step S21 to detect the subsequent monitoring timing.

When the detection flag is not "1" (No at Step S26) or no falling change point is detected (No at Step S27), the second change point detector 46 performs the processing at Step S21 to detect the subsequent monitoring timing. When no monitoring timing is detected (No at Step S21), the second measuring unit 42 performs the processing at Step S21 to monitor the detection of a monitoring timing.

FIG. 6 illustrates optical amplifiers 11 performing the first identifying processing in output power. Each of the optical amplifiers 11 detects a rising change point and a falling change point from the measured output power for each monitoring timing and identifies an optical packet signal section on the output stage side based on the detection result. As a result, the optical amplifiers 11 can identify an optical packet signal section on the output stage side in the output power in the output stage of the optical amplifying unit 21. Each of the optical amplifiers 11 executes the first identifying processing in input power in parallel with the first identifying processing in output power.

Figure 7:
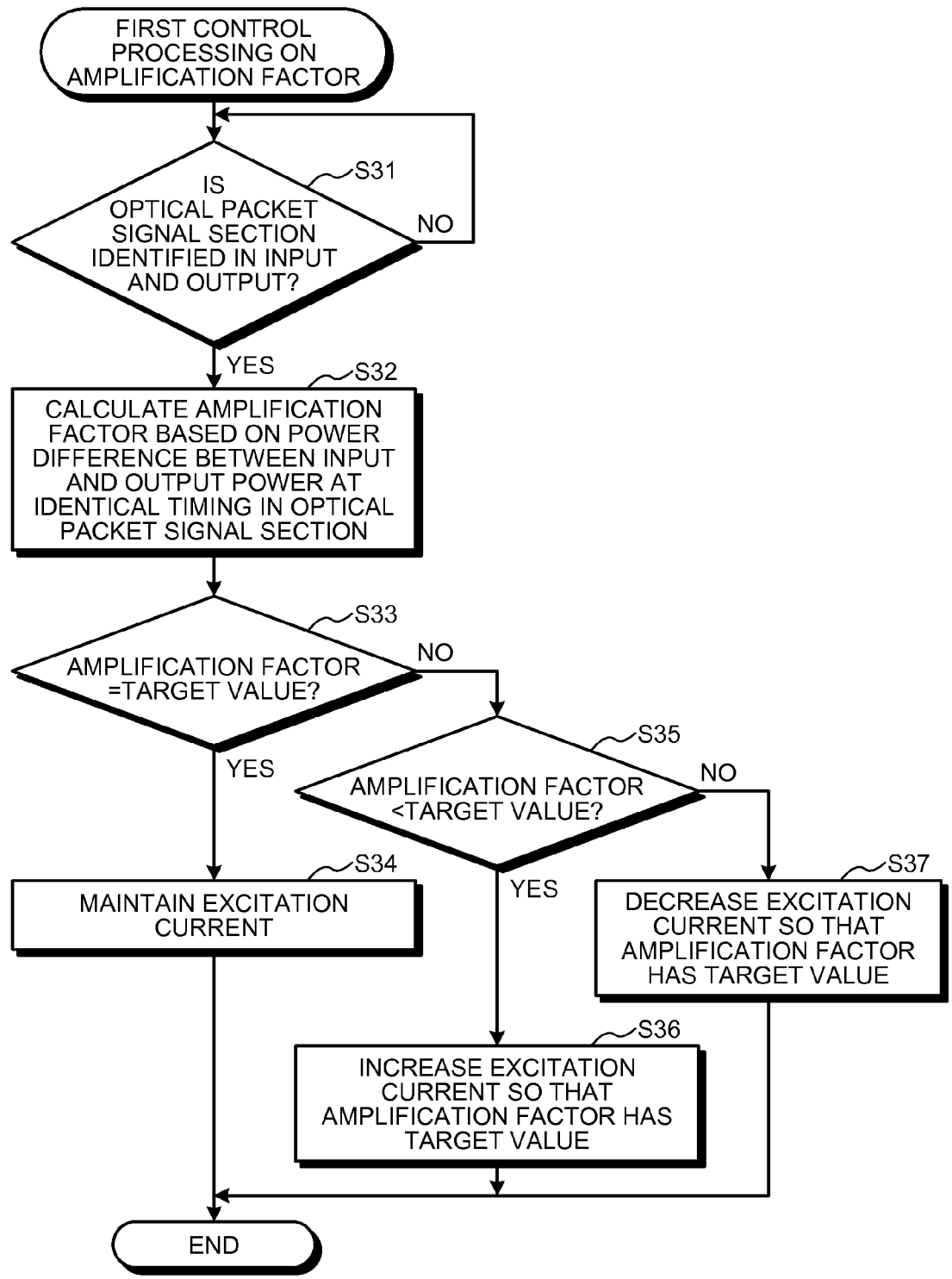
FIG. 7 is a flowchart illustrating an example of processing operation inside the optical amplifier related to first control processing on amplification factor.

FIG. 7 is a flowchart illustrating an example of processing operation inside the optical amplifiers 11 related to first control processing on amplification factor. FIG. 7 illustrates first control processing on amplification factor in which the amplification factor of the optical amplifying unit 21 is controlled based on a power difference between the input and output power in the optical packet signal sections the input and output. As illustrated in FIG. 7, the controlling unit 52 in each of the optical amplifiers 11 determines whether an optical packet signal section is identified in input and output power (Step S31). The optical packet signal sections in the input and output include an optical packet signal section on the input stage side and an optical packet signal section on the output stage side. When any optical packet signal section in the input and output is detected (Yes at Step S31), the controlling unit 52 compares the input power in the optical packet signal section on the input stage side L1 with the output power in the optical packet signal section on the output stage side L2. Subsequently, the controlling unit 52 calculates an amplification factor based on the power difference between the input power and the output power at an identical timing (Step S32).

The controlling unit 52 determines whether the calculated amplification factor has a value identical to the target value (Step S33). When the calculated amplification factor has a value identical to the target value (Yes at Step S33), the controlling unit 52 maintains the excitation current being set on the excitation unit 25 at the present (Step S34) and ends the processing operation illustrated in FIG. 7.

When the calculated amplification factor has a value not identical to the target value (No at Step S33), the controlling unit 52 determines whether the calculated amplification factor has a value smaller than the target value (Step S35). When the calculated amplification factor has a value smaller than the target value (Yes at Step S35), the controlling unit 52 increases the excitation current to the excitation unit 25 so that the amplification factor has the target value (Step S36). The controlling unit 52 then ends the processing operation illustrated in FIG. 7.

When the calculated amplification factor has a value not smaller than the target value (No at Step S35), the controlling unit 52 decreases the excitation current to the excitation unit 25 so that the amplification factor has the target value (Step S37). The controlling unit 52 then ends the processing operation illustrated in FIG. 7. When no optical packet signal section is identified (No at Step S31), the controlling unit 52 performs the processing at Step S31 to determine whether an optical packet signal section is identified.

FIG. 7 illustrates the first control processing on amplification factor performed by the controlling unit 52. In the processing, the controlling unit 52 calculates the amplification factor based on a power difference between the input and output power in the optical packet signal sections in the input and output, compares the calculated amplification factor with the target value, and supplies such an excitation current to the excitation unit 25 that the amplification factor has the target value. In this manner, the optical amplifiers 11 can ensure a stable amplification factor based on a laser beam depending on an excitation current even when an optical packet signal is mixed in.

The optical transmitter 2 according to the first embodiment identifies an optical packet signal section as input and output control timings of the optical amplifying unit 21. The optical transmitter 2 also controls an amplification factor of the optical amplifying unit 21 based on a power difference between the input and output power in the optical packet signal sections in the input and output. In this manner, the optical transmitter 2 can ensure a stable amplification factor by setting a control timing in an optical packet signal section even when an optical packet signal is mixed in and thus input power of an optical signal varies. In addition, the optical transmitter 2 stabilizes the amplification factor of the optical amplifying unit 21, thereby reducing excess amplification resulting from oscillation or resonance caused by an unstable amplification factor, as seen in conventional technologies. The optical transmitter 2 can therefore increase the transmission quality of optical signals.

In the first embodiment, the first identifying processing in input power is executed in parallel with the first identifying processing in output power, for example. The processing may be executed separately.

The optical transmitter 2 according to the first embodiment identifies the optical packet signal section on the input stage side L1 and the optical packet signal section on the output stage side L2, and controls an amplification factor of the optical amplifying unit 21 based on a power difference between the input and output power in the optical packet signal sections in the input and output. The optical packet signals, however, are mixed in an optical signal in a burst manner. Fewer optical packet signal sections therefore decrease opportunities of controlling the amplification factor of the optical amplifying unit 21. To cope with this issue, the amplification factor of the optical amplifying unit 21 may be controlled not only in an optical packet signal section but also in an optical path signal section in which no optical packet signal exists in an optical signal as a control timing. The following describes this example as a second embodiment.

[b] Second Embodiment

Figure 8:
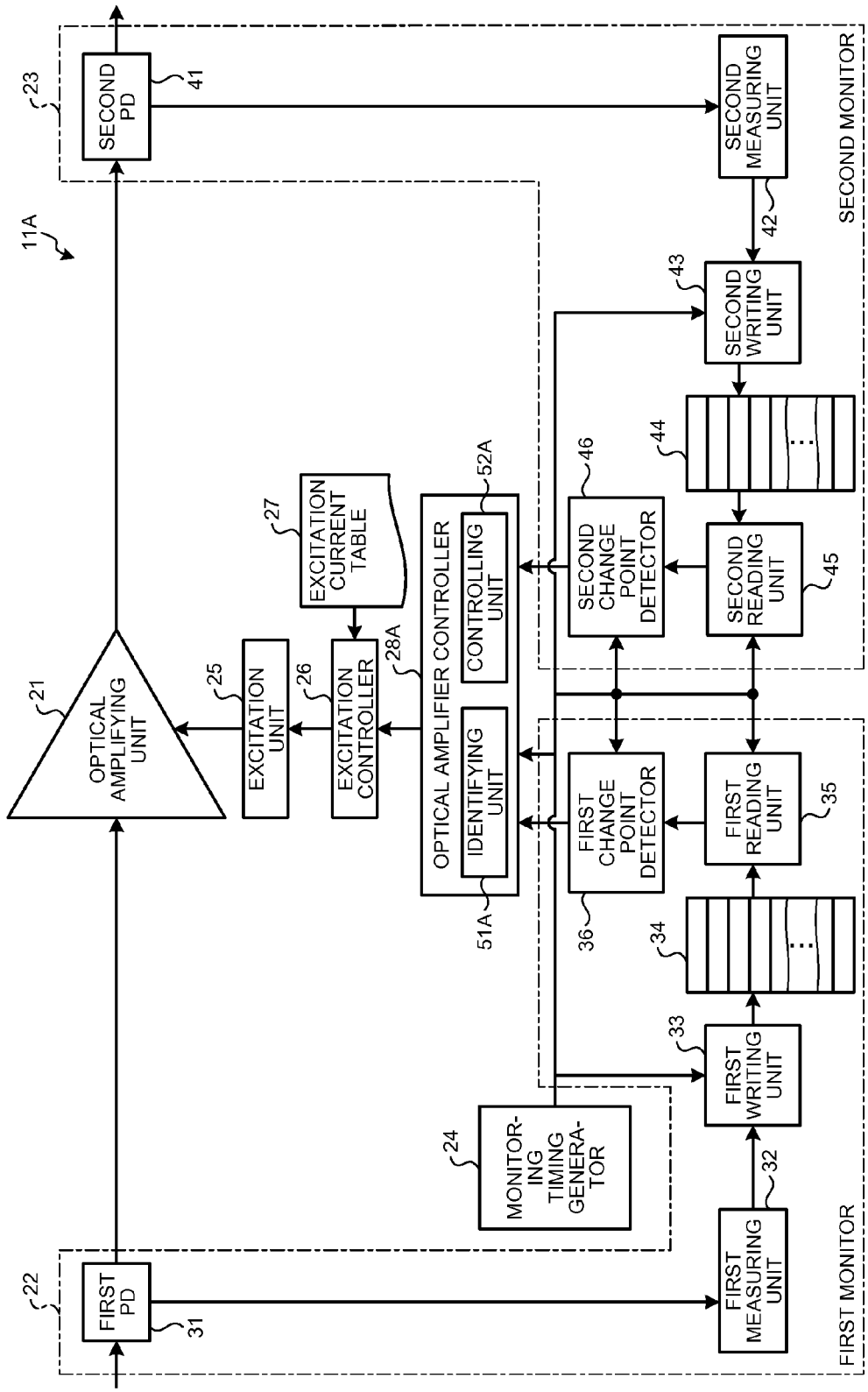
FIG. 8 is an explanatory view illustrating an example of an optical amplifier according to a second embodiment of the present invention.

FIG. 8 is an explanatory view illustrating an example of an optical amplifier 11A according to a second embodiment. In the description below, components identical to the components of the optical transmitter 2 according to the first embodiment are designated by reference numerals identical to those of the optical transmitter 2 according to the first embodiment, and overlapped explanation of the identical components or operations will be omitted. The optical amplifier 11A illustrated in FIG. 8 differs from the optical amplifier 11 illustrated in FIG. 3 in that an optical amplifier controller 28A includes an identifying unit 51A and a controlling unit 52A.

The identifying unit 51A identifies an optical packet signal section L1 in the input power acquired by the first monitor 22 and an optical packet signal section L2 in the output power acquired by the second monitor 23. The identifying unit 51A also identifies a section in which no optical packet signal exists in an optical signal, that is, an optical path signal section L3 in the input power, together with an optical path signal section L4 in the output power.

When any optical packet signal section in the input and output is identified, the controlling unit 52A controls an amplification factor of the optical amplifying unit 21 based on a power difference between the input and output power in the optical packet signal sections in the input and output. When no optical packet signal section in the input and output is identified, the controlling unit 52A identifies an optical path signal section in the input and output and controls an amplification factor of the optical amplifying unit 21 based on a power difference between the input and output power in the optical path signal sections in the input and output.

Figure 9:
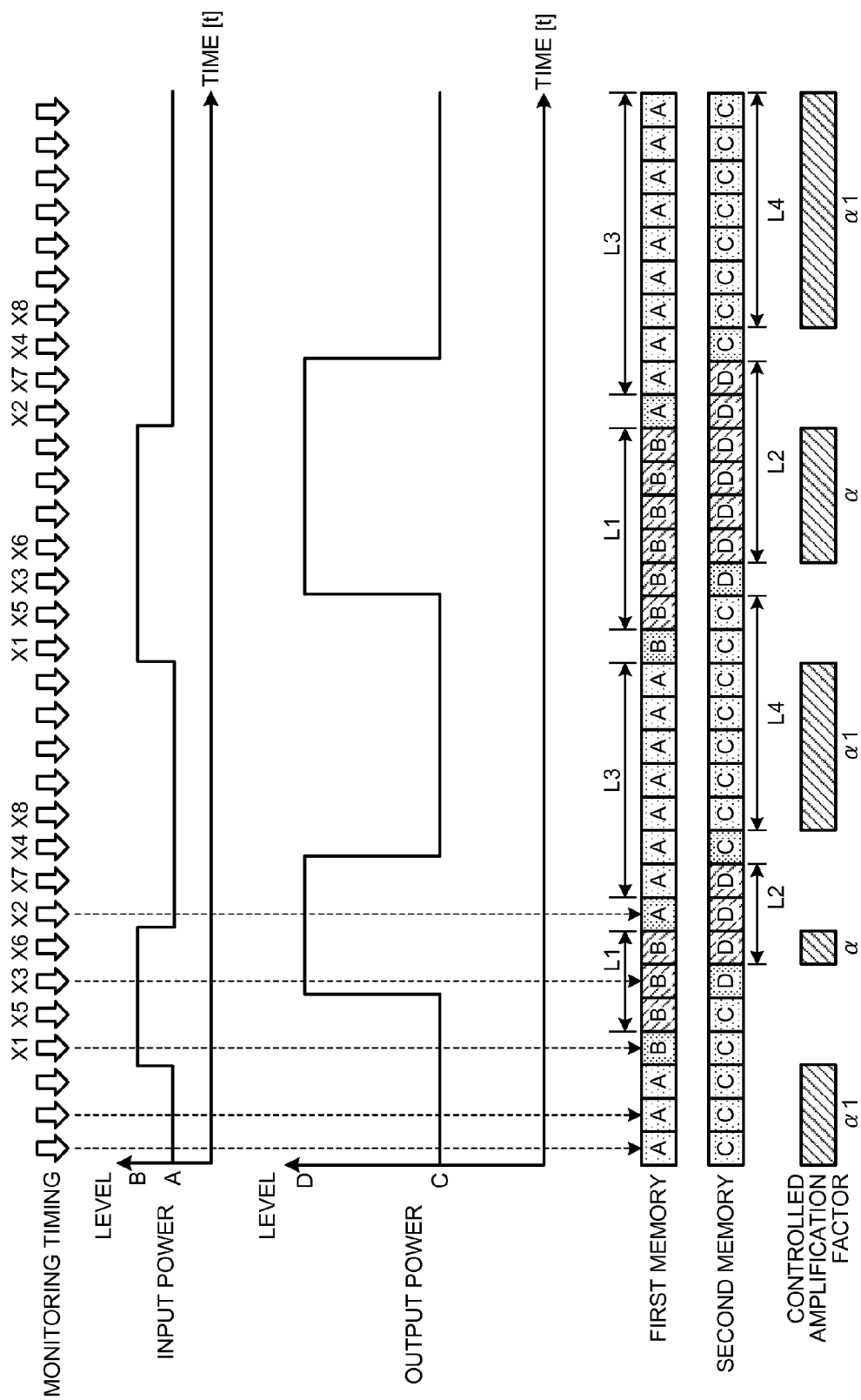
FIG. 9 is an explanatory view illustrating an example of monitoring operation on input and output power performed by the optical amplifier according to the second embodiment.

FIG. 9 is an explanatory view illustrating an example of monitoring operation on input and output power of the optical amplifiers 11A. The first change point detector 36 detects a rising change point X1 and a falling change point X2 in input power as illustrated in FIG. 9. The second change point detector 46 also detects a rising change point X3 and a falling change point X4 in output power as illustrated in FIG. 9.

The identifying unit 51A identifies an optical path signal section L3 in the input power acquired by the first monitor 22 for each monitoring timing based on the rising change point and the falling change point of the input power. When the first change point detector 36 detects a rising change point X2, the identifying unit 51A identifies a section from the subsequent monitoring timing X7 in the input power to the detection of a rising change point X1, as an optical path signal section on input stage side L3. The identifying unit 51A identifies an optical path signal section L4 in the output power acquired by the second monitor 23 for each monitoring timing. When the second change point detector 46 detects a falling change point X4, the identifying unit 51A identifies a section from the subsequent monitoring timing X8 in the input power to the detection of a rising change point X3, as an optical path signal section on output stage side L4.

The controlling unit 52A compares the power in the optical path signal section on input stage side L3 with the power in the optical path signal section on output stage side L4 and calculates a power difference between the input and output power in the optical path signal sections. Specifically, the controlling unit 52A compares the average value of the input power in the optical path signal section on the input stage side L3 with the average value of the output power in the optical path signal section on the output stage side L4, and calculates a power difference between the input and output power in the optical path signal sections. When no optical packet signal section is identified, the controlling unit 52A identifies an optical path signal section and controls an amplification factor of the optical amplifying unit 21 based on a power difference between the input and output power in the optical path signal sections in the input and output in the period α1.

Figure 10:
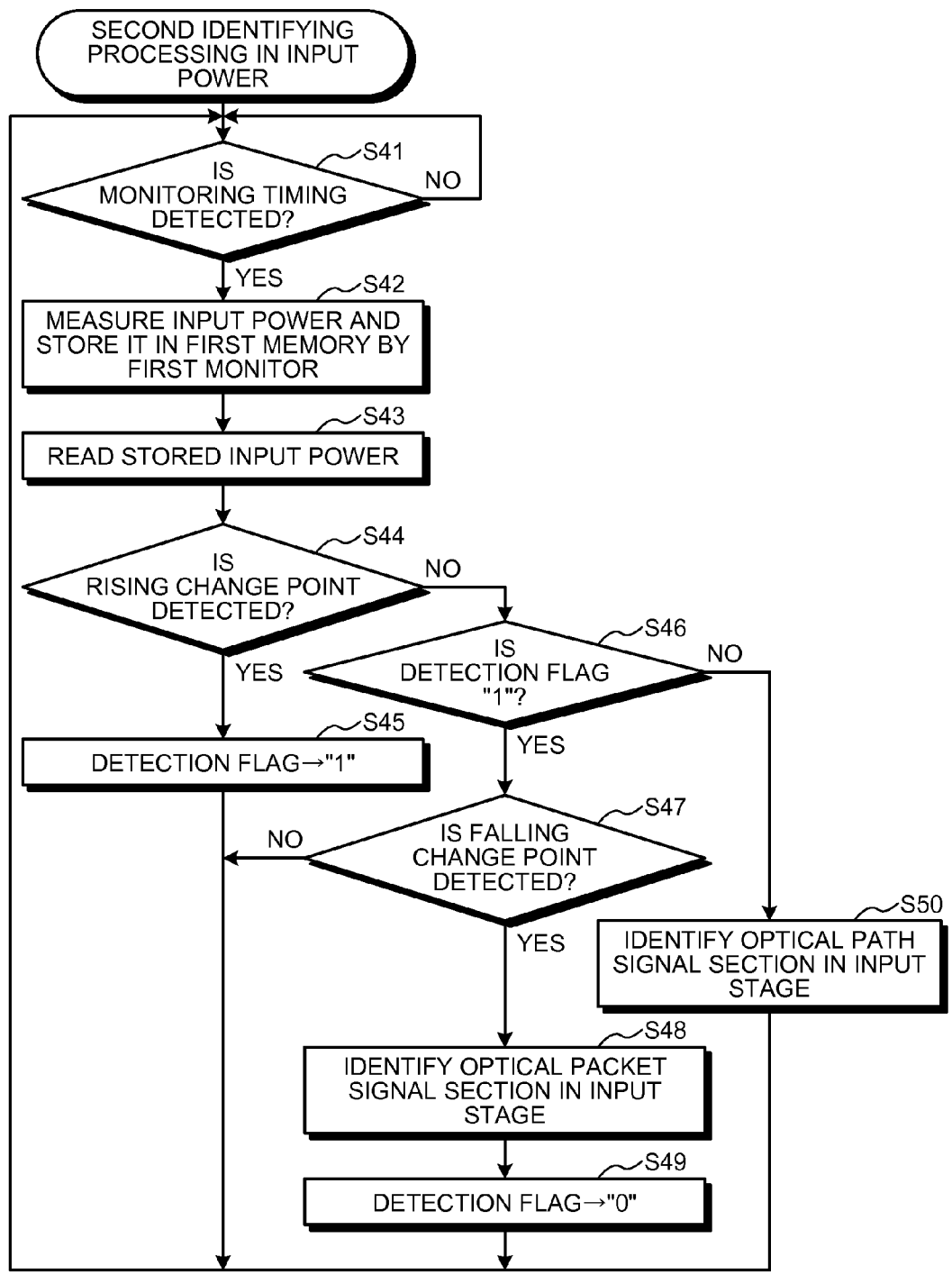
FIG. 10 is a flowchart illustrating an example of processing operation inside the optical amplifier related to second identifying processing in input power.

The following describes operation of an optical transmitter 2 according to the second embodiment. FIG. 10 is a flowchart illustrating an example of processing operation inside the optical amplifiers 11A related to second specifying processing of input power. FIG. 10 illustrates the second identifying processing in input power in which an optical packet signal section on the input stage side L1 is identified based on the rising change point and the falling change point detected from the measured input power, together with an optical path signal section on the input stage side L3.

In FIG. 10, the first measuring unit 32 in the first monitor 22 in each of the optical amplifiers 11A determines whether a monitoring timing is detected from the monitoring timing generator 24 (Step S41). When a monitoring timing is detected (Yes at Step S41), the first measuring unit 32 measures the input power at the monitoring timing through the first PD 31 and stores the input power resulting from the measurement in the first memory 34 through the first writing unit 33 (Step S42).

The first reading unit 35 reads the input power at the monitoring timing stored in the first memory 34 (Step S43). The first change point detector 36 determines whether a rising change point is detected in the read input power (Step S44). When a rising change point is detected (Yes at Step S44), the first change point detector 36 sets a detection flag to "1" indicating that a rising change point is detected (Step S45) and performs the processing at Step S41 to determine whether the subsequent monitoring timing is detected.

When no rising change point is detected in the read input power (No at Step S44), the first change point detector 36 determines whether the detection flag is "1" (Step S46). When the detection flag is "1" (Yes at Step S46), the first change point detector 36 determines whether a falling change point is detected in the input power (Step S47).

When a falling change point is detected in the input power (Yes at Step S47), the identifying unit 51 identifies an optical packet signal section in the input stage L1 (Step S48). The first change point detector 36 subsequently changes the detection flag from "1" to "0" (Step S49) and performs the processing at Step S41 to detect the subsequent monitoring timing.

When the detection flag is not "1" (No at Step S46), the identifying unit 51A identifies an optical path signal section on the input stage side L3 (Step S50), and performs the processing at Step S41 to detect the subsequent monitoring timing. When the first change point detector 36 detects a rising change point X2, the identifying unit 51A identifies a section from the subsequent monitoring timing X7 in the input power to the detection of a rising change point X1, as an optical path signal section on the input stage side L3.

When no falling change point is detected (No at Step S47), the first change point detector 36 performs the processing at Step S41 to detect the subsequent monitoring timing. When no monitoring timing is detected (No at Step S41), the first measuring unit 32 performs the processing at Step S41 to monitor detection of a monitoring timing.

FIG. 10 illustrates the optical amplifiers 11A performing the second identifying processing in input power. Each of the optical amplifiers 11A detects a rising change point and a falling change point from the measured input power for each monitoring timing and identifies an optical packet signal section on the input stage side L1 and an optical path signal section on the input stage side L3 based on the detection result. In this manner, the optical amplifiers 11A can identify an optical packet signal section on the input stage side L1 and an optical path signal section on the input stage side L3 in the input power in the input stage of the optical amplifying unit 21.

Figure 11:
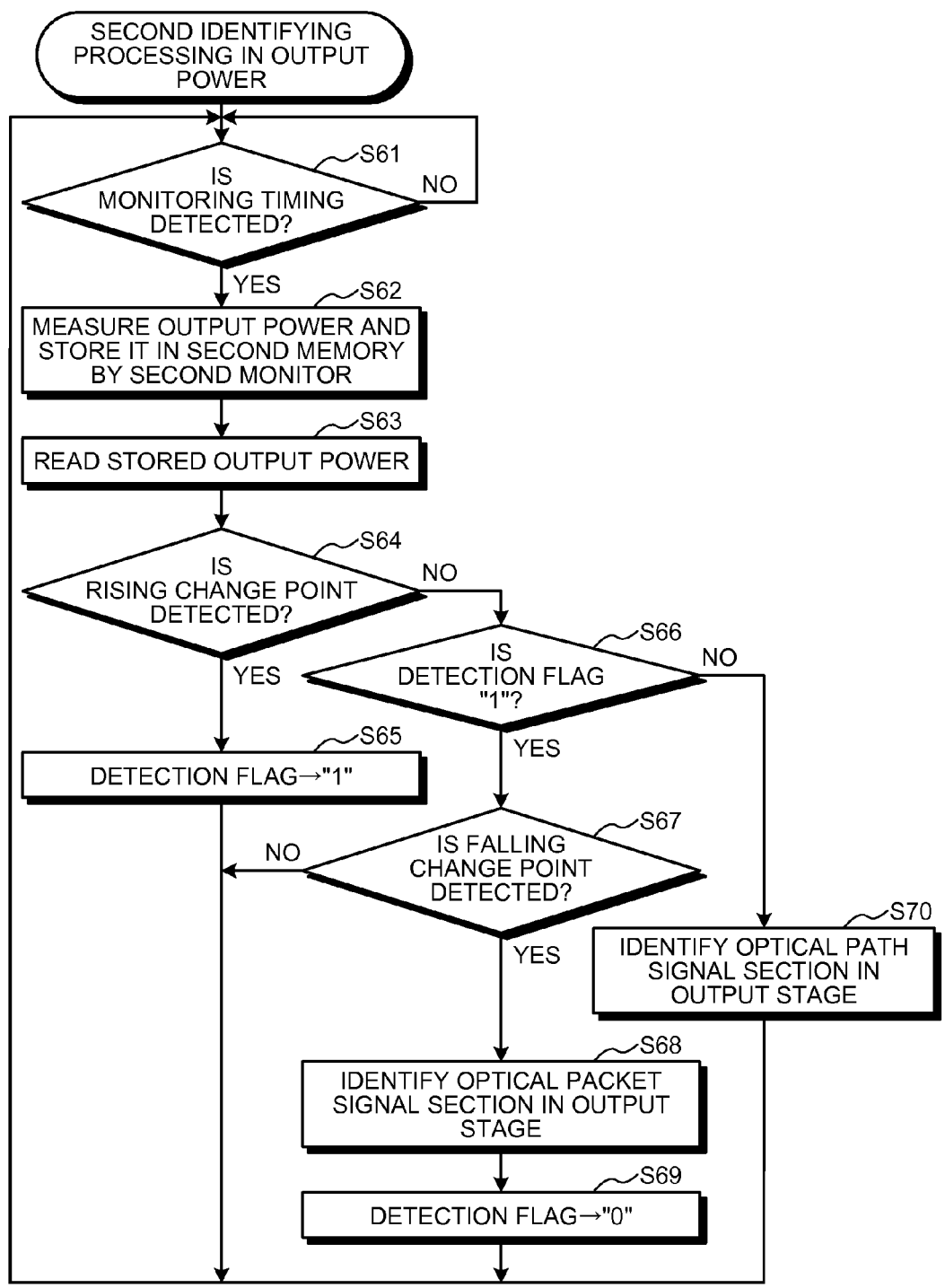
FIG. 11 is a flowchart illustrating an example of processing operation inside the optical amplifier related to second identifying processing of output power.

FIG. 11 is a flowchart illustrating an example of processing operation inside the optical amplifiers 11A related to second identifying processing in output power. FIG. 11 illustrates second identifying processing in output power in which an optical packet signal section on the output stage side L2 and an optical path signal section on the output stage side L4 are identified based on the rising change point and the falling change point detected from the measured output power.

In FIG. 11, the second measuring unit 42 in the second monitor 23 in each of the optical amplifiers 11A determines whether a monitoring timing is detected from the monitoring timing generator 24 (Step S61). When the monitoring timing is detected (Yes at Step S61), the second measuring unit 42 measures the output power at the monitoring timing through the second PD 41 and stores the output power resulting from the measurement in the second memory 44 through the second writing unit 43 (Step S62).

The second reading unit 45 reads the output power at the monitoring timing stored in the second memory 44 (Step S63). The second change point detector 46 determines whether a rising change point is detected in the read output power (Step S64). When a rising change point is detected (Yes at Step S64), the second change point detector 46 sets the detection flag to "1" indicating that a rising change point is detected (Step S65) and performs the processing at Step S61 to determine whether the subsequent monitoring timing is detected.

When no rising change point is detected in the read output power (No at Step S64), the second change point detector 46 determines whether the detection flag is "1" (Step S66). When the detection flag is "1" (Yes at Step S66), the second change point detector 46 determines whether a falling change point is detected in the output power (Step S67).

When a falling change point is detected in the output power (Yes at Step S67), the identifying unit 51A identifies an optical packet signal section on the output stage side L2 (Step S68). The second change point detector 46 subsequently changes the detection flag from "1" to "0" (Step S69) and performs the processing at Step S61 to detect the subsequent monitoring timing.

When the detection flag is not "1" (No at Step S66), the identifying unit 51A identifies an optical path signal section on output stage side L4 (Step S70), and performs the processing at Step S61 to detect the subsequent monitoring timing. When the second change point detector 46 detects a falling change point X4, the identifying unit 51A identifies a section from the subsequent monitoring timing X8 in the input power to the detection of a rising change point X3, as an optical path signal section on the output stage side L4. When no falling change point is detected (No at Step S67), the second change point detector 46 performs the processing at Step S61 to detect the subsequent monitoring timing. When no monitoring timing is detected (No at Step S61), the second measuring unit 42 performs the processing at Step S61 to monitor detection of a monitoring timing.

FIG. 11 illustrates the optical amplifiers 11A performing the second identifying processing in output power. Each of the optical amplifiers 11A detects a rising change point and a falling change point from the measured output power for each monitoring timing and identifies an optical packet signal section on the output stage side L2 and an optical path signal section on the output stage side L4 based on the detection result. In this manner, the optical amplifiers 11A can identify an optical packet signal section on the output stage side L2 and an optical path signal section on the output stage side L4 in the output power in the output stage of the optical amplifying unit 21. Each of the optical amplifiers 11A executes the second identifying processing in input power in parallel with the second identifying processing in output power.

Figure 12:
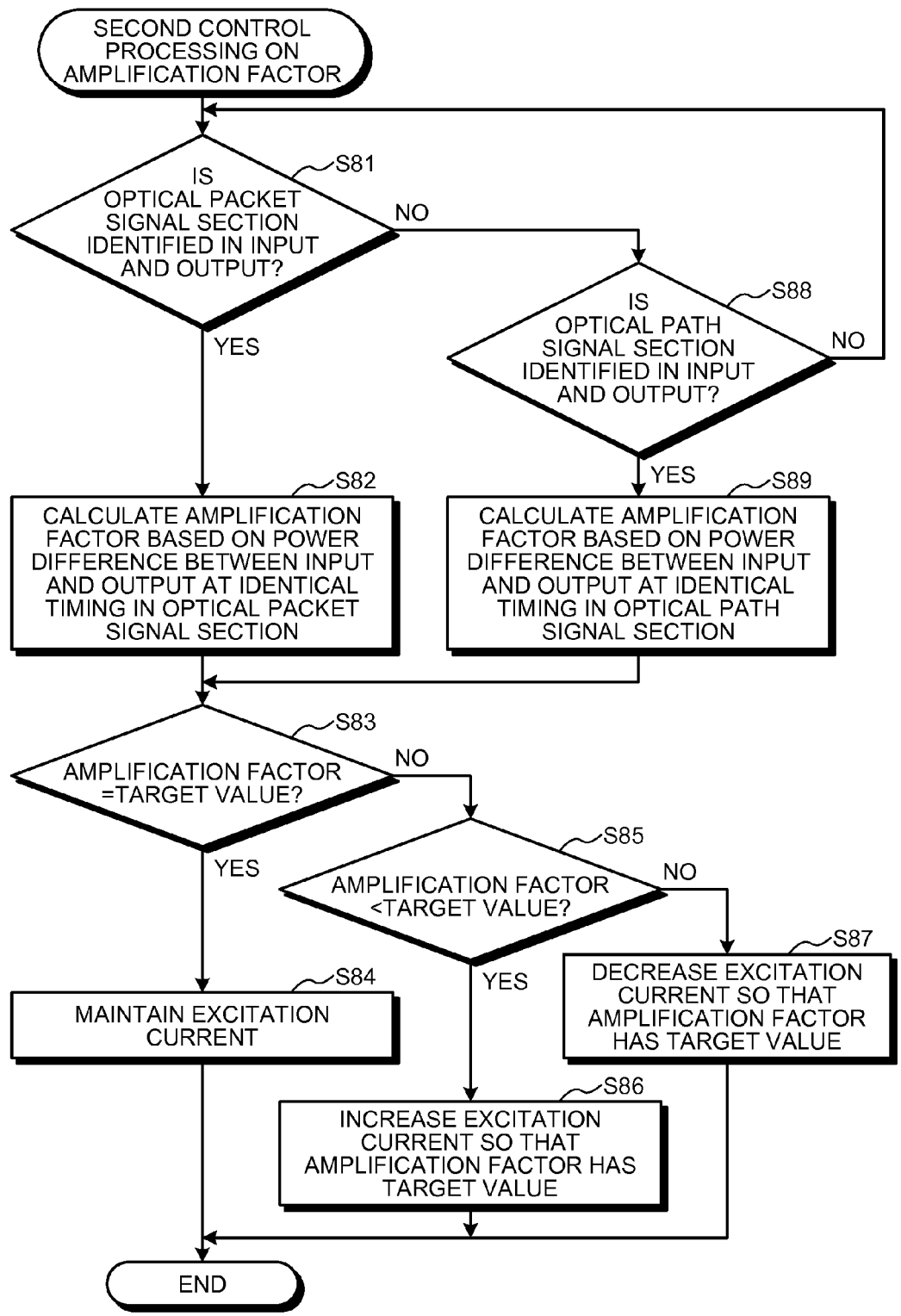
FIG. 12 is a flowchart illustrating an example of processing operation inside the optical amplifier related to second control processing on an amplification factor.

FIG. 12 is a flowchart illustrating an example of processing operation inside the optical amplifiers 11A related to second control processing of an amplification factor. FIG. 12 illustrates second control processing on an amplification factor. In the processing, the amplification factor of the optical amplifying unit 21 is controlled based on a power difference between the input and output power in the optical packet signal section or between the input and output power in the optical path signal sections of the optical amplifying unit 21.

As illustrated in FIG. 12, the controlling unit 52A in each of the optical amplifiers 11A determines whether an optical packet signal section is determined in the input and output (Step S81). The optical packet signal sections in the input and output include an optical packet signal section on the input stage side L1 and an optical packet signal section on the output stage side L2. When any optical packet signal section in the input and output is detected (Yes at Step S81), the controlling unit 52A compares the input power in the optical packet signal section on the input stage side L1 with the output power in the optical packet signal section on the output stage side L2. The controlling unit 52A then calculates an amplification factor based on the power difference between the input power and the output power at an identical timing (Step S82).

The controlling unit 52A determines whether the calculated amplification factor has a value identical to the target value (Step S83). When the calculated amplification factor has a value identical to the target value (Yes at Step S83), the controlling unit 52A maintains the excitation current being set on the excitation unit 25 at the present (Step S84) and ends the processing operation illustrated in FIG. 12.

When the calculated amplification factor has a value not identical to the target value (No at Step S83), the controlling unit 52A determines whether the calculated amplification factor has a value smaller than the target value (Step S85). When the calculated amplification factor has a value smaller than the target value (Yes at Step S85), the controlling unit 52A increases the excitation current to the excitation unit 25 so that the amplification factor has the target value (Step S86). The controlling unit 52A then ends the processing operation illustrated in FIG. 12.

When the calculated amplification factor has a value not smaller than the target value (No at Step S85), the controlling unit 52A decreases the excitation current to the excitation unit 25 so that the amplification factor has the target value (Step S87). The controlling unit 52A then ends the processing operation illustrated in FIG. 12.

When no optical packet signal section in the input and output is identified (No at Step S81), the controlling unit 52A determines whether an optical path signal section in the input and output is identified (Step S88). The optical path signal sections in the input and output include an optical path signal section on the input stage side L3 and an optical path signal section on the output stage side L4. When any optical path signal section in the input and output is detected (Yes at Step S88), the controlling unit 52A compares the input power in the optical path signal section on the input stage side L3 with the output power in the optical path signal section on the output stage side L4. Subsequently, the controlling unit 52A calculates an amplification factor based on the power difference between the input power and the output power at an identical timing (Step S89). The controlling unit 52A performs the processing at Step S83 to determine whether the calculated amplification factor has a value identical to the target value. When no optical path signal section is identified (No at Step S88), the controlling unit 52A performs the processing at Step S81 to determine whether an optical packet signal section is identified.

FIG. 12 illustrates second control processing on an amplification factor performed by each of the optical amplifiers 11A. In the processing each of the optical amplifiers 11A calculates the amplification factor based on a power difference between the input and output power in the optical packet signal sections in the input and output, and supplies such an excitation current to the excitation unit 25 that the calculated amplification factor has the target value. In this manner, the optical amplifiers 11A can ensure a stable amplification factor based on a laser beam depending on an excitation current even when an optical packet signal is mixed in.

Each of the optical amplifiers 11A performing the second control processing on an amplification factor calculates the amplification factor based on a power difference between the input and output power in the optical path signal sections in the input and output, and supplies such an excitation current to the excitation unit 25 that the calculated amplification factor has the target value. In this manner, the optical amplifiers 11A can ensure a stable amplification factor based on a laser beam depending on an excitation current even when an optical packet signal is mixed in.

The optical transmitter 2 according to the second embodiment identifies an optical packet signal section as input and output control timings of the optical amplifying unit 21. The optical transmitter 2 also controls an amplification factor of the optical amplifying unit 21 based on a power difference between the input and output power in the optical packet signal sections in the input and output. In this manner, the optical transmitter 2 can ensure a stable amplification factor by setting a control timing in an optical packet signal section even when an optical packet signal is mixed in and thus input power of an optical signal varies.

When no optical packet signal section is identified, the optical transmitter 2 identifies an optical path signal section as input and output control timings of the optical amplifying unit 21. The optical transmitter 2 also controls an amplification factor of the optical amplifying unit 21 based on a power difference between the input and output power in the optical path signal sections in the input and output. In this manner, even when no optical packet signal is mixed in, the optical transmitter 2 still can ensure a more stable amplification factor by setting a control timing in an optical path signal section, thereby increasing opportunities of control timings in comparison with the first embodiment.

In the second embodiment, the second identifying processing in input power is executed in parallel with the second identifying processing in output power, for example. The processing may be executed separately.

In each of the optical amplifiers 11A according to the second embodiment, differential delays occur between the input and output timings of the optical amplifying unit 21. Each of the optical amplifiers 11A compares the input power in the optical packet signal section on the input stage side L1 with the output power in the optical packet signal section on the output stage side L2. Subsequently, each of the optical amplifiers 11A calculates the power difference by comparing the input power with the output power without reflecting the delay time therebetween. That is, each of the optical amplifiers 11A compares the input power with the output power at an identical timing in the optical packet signal sections in the input and output without reflecting the delay time therebetween. Each of the optical amplifiers 11A may calculate a power difference with high-accuracy using an optical transmitter 2 that reflects the delay time between the input and output power. The following describes an example of such an optical transmitter 2 as a third embodiment.

[c] Third Embodiment

Figure 13:
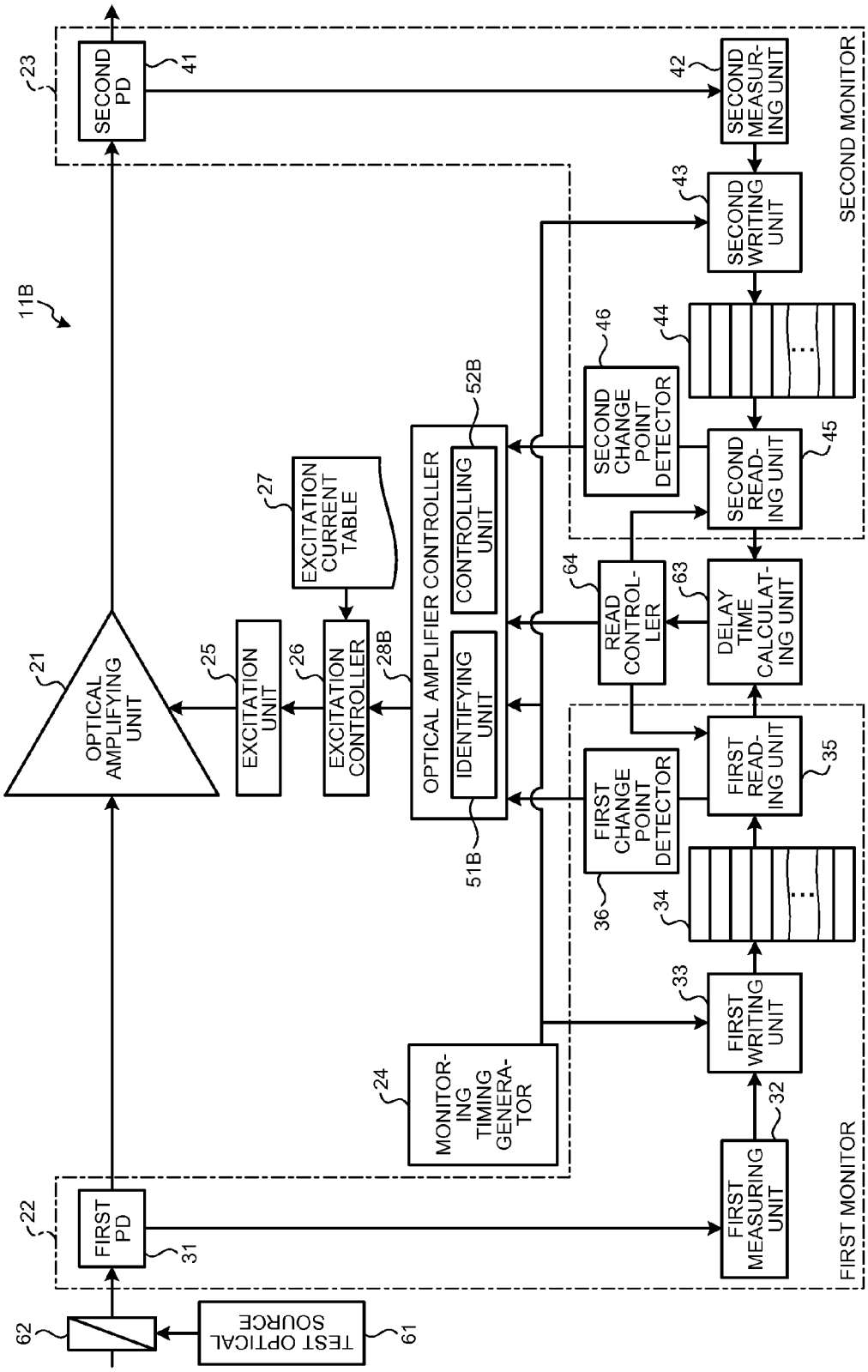
FIG. 13 is an explanatory view illustrating an example of an optical amplifier according to a third embodiment of the present invention.

FIG. 13 is an explanatory view illustrating an example of optical amplifiers 11B according to a third embodiment. In the description below, components identical to the components of the optical transmitter 2 according to the second embodiment are designated by reference numerals identical to those of the optical transmitter 2 according to the second embodiment, and overlapped explanation of the identical components or operations will be omitted.

The optical amplifier 11B illustrated in FIG. 13 includes the optical amplifying unit 21, the first monitor 22, the second monitor 23, the monitoring timing generator 24, the excitation unit 25, the excitation controller 26, the excitation current table 27, and an optical amplifier controller 28B. The optical amplifier controller 28 also includes a test optical source 61, an optical coupler 62, a delay time calculating unit 63, and a read controller 64. The optical amplifier controller 28B includes an identifying unit 51B and a controlling unit 52B.

The test optical source 61 is an optical source that emits a test pulse signal. The optical coupler 62 is located in the input stage of the input stage of the first PD 31 in each of the optical amplifiers 11B and inputs a test pulse signal from the test optical source 61. The controlling unit 52B controls the test optical source 61 to start and input the test pulse signal in the optical coupler 62 before starting the operation of the optical signal, for example, at startup of the optical transmitter 2.

The first monitor 22 acquires the test pulse signal through the first PD 31 in the input stage of the optical amplifying unit 21, and performs digital conversion on the acquired test pulse signal. The first monitor 22 then stores the converted test pulse signal in the first memory 34. The second monitor 23 acquires the test pulse signal through the second PD 41 in the output stage of the optical amplifying unit 21, and performs digital conversion on the acquired test pulse signal. The second monitor 23 then stores the converted test pulse signal in the second memory 44. The delay time calculating unit 63 compares the test pulse signal stored in the first memory 34 with the test pulse signal stored in the second memory 44, and calculates a delay time in the optical amplifying unit 21 from the difference between the input and output timings of the test pulse signal. The read controller 64 reads the input power from the first memory 34 delaying the reading timing of the input power by the delay time. The read controller 64 then outputs the read input power. In this manner, the read controller 64 can read and output the input power and the output power at an identical timing by eliminating the delay time in the optical amplifying unit 21.

Figure 14:
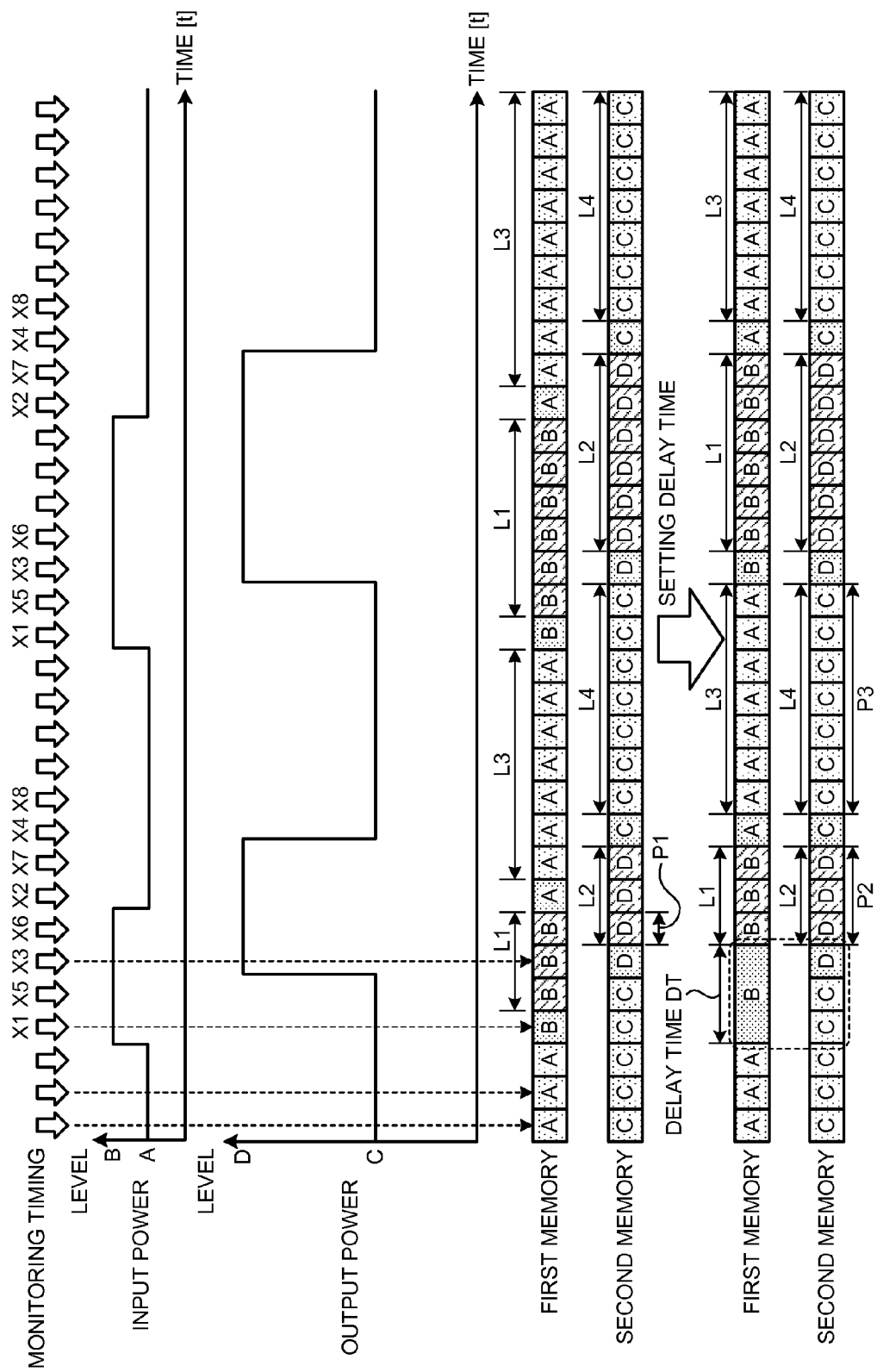
FIG. 14 is an explanatory view illustrating an example of monitoring operation on input and output power performed by the optical amplifier according to the third embodiment.

FIG. 14 is an explanatory view illustrating an example of monitoring operation on input and output power of the optical amplifiers 11B. As illustrated in FIG. 14, the read controller 64 reads and outputs the output power from the second memory 44 at a certain timing. The read controller 64 also reads the input power from the first memory 34 delaying the certain timing by the delay time DT and then outputs the read input power. In this manner, the read controller 64 can compare the input power and the output power at an identical timing by eliminating the delay time in the optical amplifying unit 21.

The controlling unit 52B compares the input power with the output power at an identical timing in the optical packet signal sections in the output and input or the input power with the output power at an identical timing in the optical path signal sections in the output and input, and controls an amplification factor of the optical amplifying unit 21 based on a power difference therebetween. In the second embodiment, a power value P1 is used for a target sampling value for comparison in the optical packet signal sections L1 and L2. By contrast, in the third embodiment, a power value P2 is used for three target sampling values for comparison in the optical packet signal sections L1 and L2. This configuration increases the accuracy of the calculation of the power difference.

Figure 15:
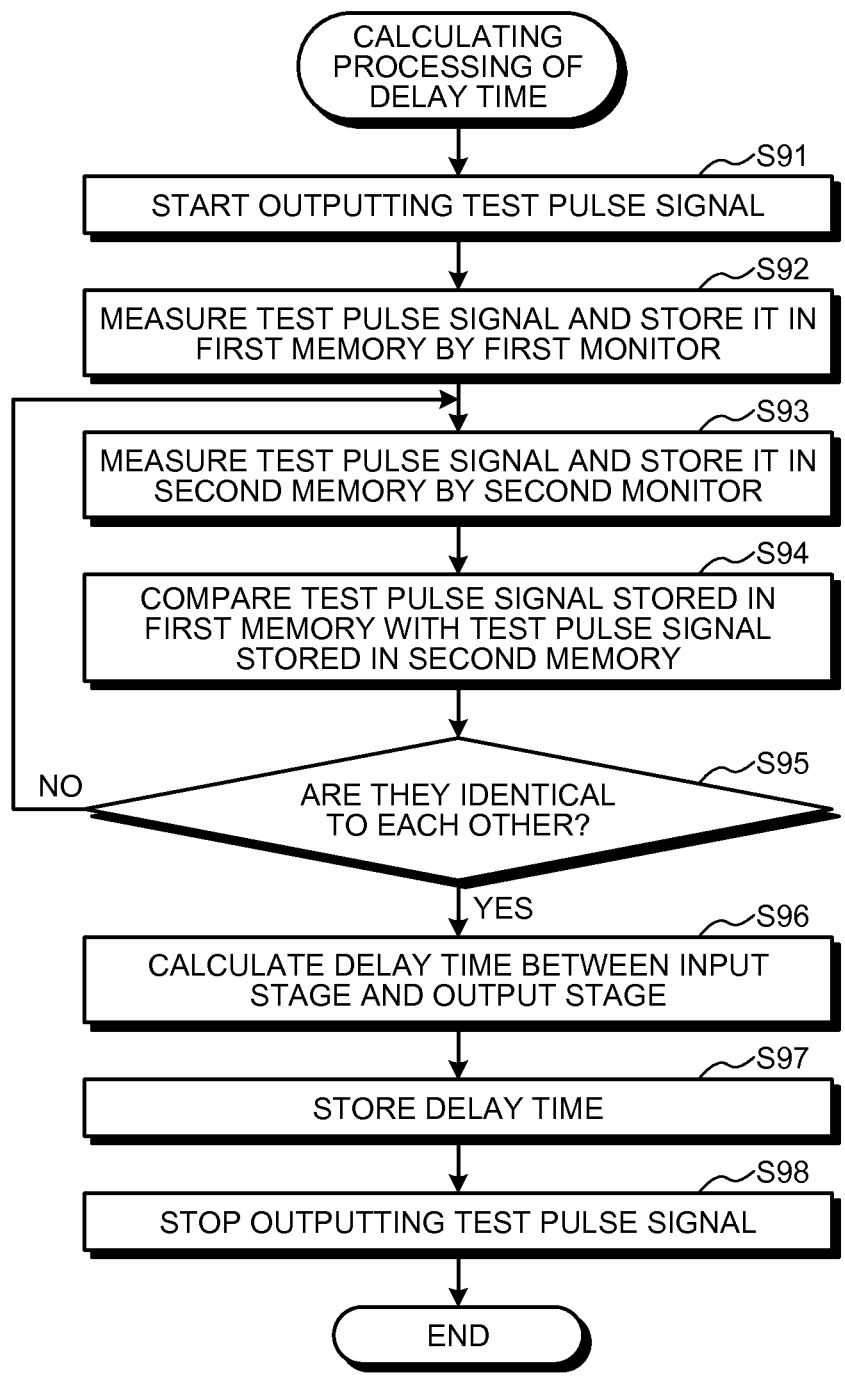
FIG. 15 is a flowchart illustrating an example of processing operation inside the optical amplifier related to calculating processing of delay time.

The following describes operation of the optical transmitter 2 according to the third embodiment. FIG. 15 is a flowchart illustrating an example of processing operation inside the optical amplifiers 11B related to calculating processing of delay time. FIG. 15 illustrates the calculating processing of delay time. In the processing, a test pulse signal is input in the optical amplifying unit 21, thereby calculating a delay time of the test pulse signal for the input and output power of the optical amplifying unit 21. The calculating processing of delay time is started before the operation of the optical transmitter 2, for example, at startup of the optical transmitter 2.

As illustrated in FIG. 15, the delay time calculating unit 63 of each of the optical amplifiers 11B instructs the test optical source 61 to start outputting a test pulse signal (Step S91). The delay time calculating unit 63 acquires the test pulse signal from the test optical source 61 through the first measuring unit 32 in the first monitor 22, and stores the acquired test pulse signal in the first memory 34 (Step S92). The test pulse signal stored in the first memory 34 corresponds to the test pulse signal in the input stage of the optical amplifying unit 21. The delay time calculating unit 63 acquires the test pulse signal from the test optical source 61 through the second measuring unit 42 in the second monitor 23, and stores the acquired test pulse signal in the second memory 44 (Step S93). The test pulse signal stored in the second memory 44 corresponds to the test pulse signal in the output stage of the optical amplifying unit 21.

The delay time calculating unit 63 compares the test pulse signal stored in the first memory 34 with the test pulse signal stored in the second memory 44 (Step S94), and determines whether they are identical to each other in the comparison (Step S95).

When the test pulse signals are identical to each other in the comparison (Yes at Step S95), the delay time calculating unit 63 calculates the delay time between the test pulse signal in the input stage and the test pulse signal in the output stage (Step S96). The delay time is represented with a monitoring timing. In this manner, the delay time calculating unit 63 obtains a delay time in the optical amplifying unit 21. The delay time calculating unit 63 stores the calculated delay time in the read controller 64 (Step S97). After storing the delay time, the delay time calculating unit 63 instructs the test optical source 61 to stop outputting the test pulse signal (Step S98), and ends the processing operation illustrated in FIG. 15.

When the test pulse signals are not identical to each other in the comparison (No at Step S95), the delay time calculating unit 63 performs the processing at Step S93 to measure the test pulse signal in the second monitor 23 and stores the result in the second memory 44.

FIG. 15 illustrates the calculating processing of delay time. In the processing, the delay time calculating unit 63 inputs the test pulse signal from the test optical source 61 in the optical amplifying unit 21 at startup of the optical transmitter 2 and calculates the delay time based on the input and output timings of the test pulse signal of the optical amplifying unit 21. The delay time calculating unit 63 stores the calculated delay time in the read controller 64. In this manner, the read controller 64 can recognize a delay time in the optical amplifying unit 21 using the test pulse signal.

FIG. 16 is a flowchart illustrating an example of processing operation inside the optical amplifiers 11B related to third control processing of an amplification factor. FIG. 16 illustrates third control processing on an amplification factor. In the processing the amplification factor of the optical amplifying unit 21 is controlled using the delay time DT from the input to the output in the optical amplifying unit 21 based on a power difference between the input and output power at an identical timing in the optical packet signal sections or between the input and output power at an identical timing in the optical path signal sections of the optical amplifying unit 21.

In FIG. 16, the controlling unit 52B determines whether an optical packet signal section is identified in the input and output (Step S101). When any optical packet signal section in the input and output is detected (Yes at Step S101), the controlling unit 52B calculates an amplification factor based on the power difference between the input power and the output power at an identical timing reflecting the delay time in the optical packet signal section (Step S102). The read controller 64 reads and outputs the output power from the second memory 44 at a certain timing. The read controller 64 also reads the input power from the first memory 34 delaying the certain timing by the delay time DT and then outputs the read input power. In this manner, the read controller 64 can compare the input power with the output power of an optical signal at an identical timing between the input stage and the output stage of the optical signal.

The controlling unit 52B determines whether the calculated amplification factor has a value identical to the target value (Step S103). When the calculated amplification factor has a value identical to the target value (Yes at Step S103), the controlling unit 52B maintains the excitation current being set on the excitation unit 25 at the present (Step S104) and ends the processing operation illustrated in FIG. 16.

When the calculated amplification factor has a value not identical to the target value (No at Step S103), the controlling unit 52B determines whether the calculated amplification factor has a value smaller than the target value (Step S105). When the calculated amplification factor has a value smaller than the target value (Yes at Step S105), the controlling unit 52B increases the excitation current to the excitation unit 25 so that the amplification factor has the target value (Step S106). The controlling unit 52B then ends the processing operation illustrated in FIG. 16.

When the calculated amplification factor has a value not smaller than the target value (No at Step S105), the controlling unit 52B decreases the excitation current to the excitation unit 25 so that the amplification factor has the target value (Step S107). The controlling unit 52B then ends the processing operation illustrated in FIG. 16.

When no optical packet signal section in the input and output is identified (No at Step S101), the controlling unit 52B determines whether an optical path signal section in the input and output is identified (Step S108). When any optical path signal section in the input and output is detected (Yes at Step S108), the controlling unit 52B calculates an amplification factor based on the power difference between the input power and the output power at an identical timing reflecting the delay time in the optical path signal section (Step S109). The controlling unit 52B performs the processing at Step S103 to determine whether the calculated amplification factor has a value identical to the target value. When no optical path signal section is identified (No at Step S108), the controlling unit 52B performs the processing at Step S101 to determine whether an optical packet signal section is identified.

FIG. 16 illustrates third control processing on an amplification factor performed by the controlling unit 52B. In the processing the controlling unit 52B calculates the amplification factor based on a power difference between the input and output power in the optical packet signal sections in the input and output reflecting the delay time DT between the input and output in the optical amplifying unit 21, and compares the calculated amplification factor with the target value. The controlling unit 52B supplies such an excitation current to the excitation unit 25 that the amplification factor has the target value. In this manner, the optical amplifiers 11B can ensure a stable amplification factor based on a laser beam depending on an excitation current even when an optical packet signal is mixed in.

The controlling unit 52B calculates the amplification factor based on a power difference between the input and output power in the optical path signal sections in the input and output reflecting the delay time DT, compares the calculated amplification factor with the target value, and supplies such an excitation current to the excitation unit 25 that the amplification factor has the target value. In this manner, the optical amplifiers 11B can ensure a stable amplification factor based on a laser beam depending on an excitation current even when no optical packet signal is mixed in.

The optical transmitter 2 according to the third embodiment calculates a delay time in the optical amplifying unit 21. The optical transmitter 2 compares the input power with the output power in the optical packet signal sections in the input and output by delaying the reading timing of the input power in the optical packet signal section on the input stage side by the delay time. This operation is performed to match the reading timing of the input power with the reading timing of the output power in the optical packet signal section on the output stage side. This operation enables the controlling unit 52B to use target sampling values for comparison as many as possible for the power value P2 when comparing the input power with the output power at an identical timing in the optical packet signal sections. In this manner, the controlling unit 52B can ensure a stable amplification factor by calculating the power difference with high accuracy.

The optical transmitter 2 compares the input power with the output power in the optical path signal sections in the input and output by delaying the reading timing of the input power in the optical path signal section on the input stage side by the delay time. This operation is performed to match the reading timing of the input power with the reading timing of the output power in the optical path signal section on the output stage side. This operation enables the controlling unit 52B to use target sampling values for comparison as many as possible for the power value P3 when comparing the input power with the output power at an identical timing in the optical path signal sections. In this manner, the controlling unit 52B can ensure a stable amplification factor by calculating the power difference with high accuracy.

In the embodiments, the start point of the optical packet signal section is a monitoring timing immediately after the detection of the rising change point, but the description is provided merely for exemplary purpose. The start point of the optical packet signal section may be a second monitoring timing immediately after the detection of the rising change point, or other monitoring timings. The start point of the optical packet signal section may also be a timing of the detection of the rising change point.

In the embodiments, the input power in the optical packet signal section on the input stage side is compared with the output power in the optical packet signal section on the output stage side by using the respective average values of the power, but this operation is provided merely for exemplary purpose. The comparison may be performed by using the power values acquired at each monitoring timing or other values.

In the optical transmitter 2 according to the third embodiment, the test optical source 61 is started at startup of the optical transmitter 2 to output a test pulse signal, but this operation is provided merely for exemplary purpose. The test optical source 61 may be started at any given operation. The pulse width of the test pulse signal can be varied.

The embodiment exemplifies a rare-earth doped fiber such as an erbium doped-fiber (EDF) as the optical amplifiers 11 (11A, 11B). Examples of the optical amplifiers 11 (11A, 11B) may include a semiconductor optical amplifier (SOA).

The embodiments exemplify the optical transmitters 2 of the WDM system 1 in which input power of the optical amplifiers 11 varies because optical packet signals in an optical signal of the WDM system 1 exist in a burst manner, but this configuration is provided merely for exemplary purpose. Other signals multiplexed into optical signals in a burst manner may be used instead. The components in the embodiments are applicable to other systems.

The components of each of the illustrated units are not necessarily configured physically as illustrated. In other words, specific states of distributing or integrating each of the units are not limited to the illustrated states, and all of or a part of the units can be configured to be functionally or physically distributed or integrated in a desired unit depending on various kinds of loads and use situations.

All of or any part of the processing functions executed by each of the apparatuses may be executed on a central processing unit (CPU) (or microcomputers such as a micro processing unit (MPU) and a micro controller unit (MCU)). It goes without saying that all of or any part of the processing functions may be executed on a computer program analyzed and performed by the CPU (or microcomputers such as the MPU and the MCU), or on hardware based on the wired logic.

An aspect of an embodiment of the invention enables a stable amplification factor to be ensured even when an optical path signal and an optical packet signal are mixed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter comprising:
an amplifying unit that amplifies optical signals in which an optical packet signal is mixed in optical path signals;
a monitor that monitors power of the optical signals related to an input stage and an output stage of the amplifying unit;
an identifying unit that identifies an optical packet signal section on the input stage side in which the optical packet signal exists in the optical signals based on the monitoring result of the power of the optical signal on the input stage side, identifies the optical packet signal section on the output stage side based on the monitoring result of the power of the optical signal on the output stage side, identifies an optical path signal section on the input stage side in which no optical packet signal exists in the optical signal based on the monitoring result of the power of the optical signal on the input stage side, and identifies the optical path signal section on the output stage side based on the monitoring result of the power of the optical signal on the output stage side; and
a controlling unit that compares the power in the optical packet signal section on the input stage side identified by the identifying unit with the power in the optical packet signal section on the output stage side identified by the identifying unit, controls an amplification factor of the amplifying unit based on the comparison result, compares the power in the optical path signal section on the input stage side with the power in the optical path signal section on the output stage side, and controls the amplification factor of the amplifying unit based on the comparison result, when the optical path signal section is identified by the identifying unit.

2. An optical transmission method causing an optical transmitter to execute a process comprising:
when an amplifying unit amplifies optical signals in which an optical packet signal is mixed in optical path signals, monitoring power of the optical signals related to an input stage and an output stage of the amplifying unit;
identifying an optical packet signal section on the input stage side in which the optical packet signal exists in the optical signal based on the monitoring result of the power of the optical signal on the input stage side, identifying the optical packet signal section on the output stage side based on the monitoring result of the power of the optical signal on the output stage side, identifying an optical path signal section on the input stage side in which no optical packet signal exists in the optical signal based on the monitoring result of the power of the optical signal on the input stage side, and identifying the optical path signal section on the output stage side based on the monitoring result of the power of the optical signal on the output stage side; and
comparing the power in the optical packet signal section on the input stage side with the power in the optical packet signal section on the output stage side, controlling an amplification factor of the amplifying unit based on the comparison result, comparing the power in the optical path signal section on the input stage side with the power in the optical path signal section on the output stage side, and controlling the amplification factor of the amplifying unit based on the comparison result, when the optical path signal section is identified by the identifying unit.

3. An optical transmitter comprising:
an amplifying unit that amplifies optical signals in which an optical packet signal is mixed in optical path signals;
a monitor that monitors power of the optical signals related to an input stage and an output stage of the amplifying unit;
an identifying unit that identifies an optical packet signal section on the input stage side in which the optical packet signal exists in the optical signals based on the monitoring result of the power of the optical signal on the input stage side, and identifies the optical packet signal section on the output stage side based on the monitoring result of the power of the optical signal on the output stage side; and
a controlling unit that compares the power in the optical packet signal section on the input stage side identified by the identifying unit with the power in the optical packet signal section on the output stage side identified by the identifying unit at an identical timing of the optical signal using a time difference of the optical signal from the input stage to the output stage, and controls an amplification factor of the amplifying unit based on the comparison result.

4. An optical transmitter comprising:
an amplifying unit that amplifies optical signals in which an optical packet signal is mixed in optical path signals;
a monitor that monitors power of the optical signals related to an input stage and an output stage of the amplifying unit;
an identifying unit that identifies an optical packet signal section on the input stage side in which the optical packet signal exists in the optical signals based on a rising change point and a falling change point related to variation of the power of the optical signal on the input stage side, and identifies the optical packet signal section on the output stage side based on the rising change point and the falling change point related to variation of the power of the optical signal on the output stage side; and
a controlling unit that compares the power in the optical packet signal section on the input stage side identified by the identifying unit with the power in the optical packet signal section on the output stage side identified by the identifying unit, and controls an amplification factor of the amplifying unit based on the comparison result.

5. An optical transmission method causing an optical transmitter to execute a process comprising:
when an amplifying unit amplifies optical signals in which an optical packet signal is mixed in optical path signals, monitoring power of the optical signals related to an input stage and an output stage of the amplifying unit;
identifying an optical packet signal section on the input stage side in which the optical packet signal exists in the optical signal based on the monitoring result of the power of the optical signal on the input stage side, and identifying the optical packet signal section on the output stage side based on the monitoring result of the power of the optical signal on the output stage side; and
comparing the power in the optical packet signal section on the input stage side with the power in the optical packet signal section on the output stage side at an identical timing of the optical signal using a time difference of the optical signal from the input stage to the output stage, and controlling an amplification factor of the amplifying unit based on the comparison result.

6. An optical transmission method causing an optical transmitter to execute a process comprising:
when an amplifying unit amplifies optical signals in which an optical packet signal is mixed in optical path signals, monitoring power of the optical signals related to an input stage and an output stage of the amplifying unit;
identifying an optical packet signal section on the input stage side in which the optical packet signal exists in the optical signal based on a rising change point and the falling change point related to variation of the power of the optical signal on the input stage side, and identifying the optical packet signal section on the output stage side based on the rising change point and the falling change point related to variation of the power of the optical signal on the output stage side; and
comparing the power in the optical packet signal section on the input stage side with the power in the optical packet signal section on the output stage side, and controlling an amplification factor of the amplifying unit based on the comparison result.

* * * * *